US011133725B2

(12) United States Patent
Calverley et al.

(10) Patent No.: US 11,133,725 B2
(45) Date of Patent: Sep. 28, 2021

(54) ELECTRICAL MACHINE AND A METHOD OF OPERATING AN ELECTRICAL MACHINE

(71) Applicant: Magnomatics Limited, South Yorkshire (GB)

(72) Inventors: Stuart Calverley, Yorkshire (GB); Petr Chmelicek, Sheffield (GB)

(73) Assignee: Magnomatics Limited, Yorkshire (GB)

( * ) Notice: Subject to any disclaimer, the term of this patent is extended or adjusted under 35 U.S.C. 154(b) by 56 days.

(21) Appl. No.: 16/478,124

(22) PCT Filed: Jan. 16, 2018

(86) PCT No.: PCT/GB2018/050116
§ 371 (c)(1),
(2) Date: Jul. 15, 2019

(87) PCT Pub. No.: WO2018/130859
PCT Pub. Date: Jul. 19, 2018

(65) Prior Publication Data
US 2019/0341828 A1    Nov. 7, 2019

(30) Foreign Application Priority Data
Jan. 16, 2017    (GB) ..................... 1700731

(51) Int. Cl.
*H02K 7/11* (2006.01)
*H02K 3/00* (2006.01)
(Continued)

(52) U.S. Cl.
CPC ............... *H02K 7/11* (2013.01); *H02K 16/02* (2013.01); *H02K 49/102* (2013.01)

(58) Field of Classification Search
CPC ............ H02K 7/00; H02K 7/08; H02K 7/083; H02K 7/11; H02K 7/20; H02K 7/116;
(Continued)

(56) References Cited

U.S. PATENT DOCUMENTS 9,431,884 B2    8/2016  Ramamoorthy
2004/0108781 A1*  6/2004  Razzell ................. H02K 7/11
310/112
(Continued)

FOREIGN PATENT DOCUMENTS

WO    WO2012133905 A1    5/2015
WO    WO2015103781 A1    7/2015

OTHER PUBLICATIONS

Salihu et al., "A Novel Double-Stator Permanent Magnet Generator Integrated With a Magnetic Gear," Progress in Electromagnetics Research M, vol. 49, Jan. 1, 2016 (Jan. 1, 2016), pp. 69-80.
(Continued)

*Primary Examiner* — Tran N Nguyen
(74) *Attorney, Agent, or Firm* — Lee & Hayes, P.C.

(57) ABSTRACT

An electrical machine comprising: a first rotor, the first rotor producing a first magnetic field having a first number of pole pairs; a second rotor comprising a plurality of pole pieces, the plurality of pole pieces being arranged to modulate the first magnetic field to produce a second magnetic field having a second number of pole pairs; a stator Comprising one or more windings arranged to produce a third magnetic field arranged to interact with the first number of pole pairs and the second number of pole pairs; wherein the interaction of the third magnetic field with the first number of pole pairs and the second number of pole pairs changes a torque ratio between the first rotor and the second rotor.

22 Claims, 11 Drawing Sheets

(51) Int. Cl.
 *H02K 16/02* (2006.01)
 *H02K 49/10* (2006.01)
(58) Field of Classification Search
 CPC ........ H02K 16/00; H02K 16/02; H02K 21/22;
  H02K 21/222; H02K 21/44; H02K 19/00;
   H02K 19/02; H02K 1/14; H02K 1/146;
    H02K 49/00; H02K 49/10; H02K 49/102
 See application file for complete search history.

(56) References Cited

U.S. PATENT DOCUMENTS

| | | | |
|---|---|---|---|
| 2006/0042022 A1* | 3/2006 | Kim | D06F 37/304 8/159 |
| 2013/0057091 A1* | 3/2013 | Kim | H02K 21/44 310/46 |
| 2016/0218579 A1 | 7/2016 | Peng et al. | |

OTHER PUBLICATIONS

Shuangxia et al., "Design of a Novel Electrical Continuously Variable Transmission System Based on Harmonic Spectra Analysis of Magnetic Field," IEEE Transactions on Magnetics, IEEE Service Center, New York, NY, US, vol. 49, No. 5, May 1, 2013, pp. 2161-2164.
PCT International Search Report and Written Opinion dated May 16, 2018 for PCT application No. PCT/GB2018/050116, 16 pages.

\* cited by examiner

ELECTRICAL MACHINE AND A METHOD OF OPERATING AN ELECTRICAL MACHINE

RELATED APPLICATIONS

This application is a national stage application under 35 U.S.C. 371 of PCT International Application No. PCT/GB2018/050116, filed Jan. 16, 2018, which claims priority to Great Britain Patent Application GB 1700731.1, filed on Jan. 16, 2017, entitled "An Electrical Machine and a Method of Operating an Electrical Machine," which applications are hereby incorporated by reference in their entirety.

FIELD

This disclosure relates to an electrical machine and a method of operating an electrical machine. Embodiments of the electrical machine comprise magnetically geared members.

BACKGROUND

While the vast majority of gearing solutions have used mechanical gearing arrangements, there is increasing interest in and demand for smaller, more lightweight, more efficient and less expensive gearing solutions that offer the high-torque transmission of existing mechanical arrangements. Magnetic gearing arrangements are an example of such a solution.

A magnetic gear uses magnetic fields to transmit torque without mechanical contact. In one form, a magnetic gear has three principle components, all three of which may rotate relative to each other. In one existing arrangement a radially inner one of the three components generates a first magnetic field with a first number of pole pairs. A radially outer one of the three components generates a second magnetic field with a second number of pole pairs. A radially intermediate one of the three components does not generate its own magnetic field. Instead, it has a number of ferromagnetic pole pieces supported by a non-magnetic and non-conductive structure. This third component acts as a passive part of a magnetic circuit between the first and second components. The role of the pole pieces is to modulate the first and second magnetic fields such that they interact in a geared manner. Consequently, torque can be transmitted between the three components in a geared manner in a manner similar to an epicyclic mechanical gear arrangement.

Other forms of magnetically geared apparatus comprise a passive gear with two permanent magnet components and a modulating ring component; a motor generator with a stator wrapped around a magnetic gear; a motor generator with an integrated gear with a rotating permanent magnet rotor, a rotating modulating rotor, and a static array of magnets and windings; a variable magnetic gear with three rotors, two with permanent magnet arrays and a modulating rotor, and a stator winding to control the rotation of one of the rotors; and/or a variable magnetic gear with one permanent magnet rotor, a modulating rotor, and a stator winding which can couple with the modulated field and control rotational speed and therefore gear ratio.

An example of a magnetic gear 100 is shown in FIG. 1. In this case, the outer component 110 is provided with a set of windings 115 to become—in effect—the stator of a motor-generator. This arrangement combines the functionality of a magnetic gear and a typical electrical machine by allowing for geared torque transmission in combination with operation in either motoring or generating modes. In this case, the first magnetic field is generated by permanent magnets 135 on the inner component 130. The second magnetic field is generated by current flowing in the windings 115 on the outer component 110. As before, the third component 120 has a number of ferromagnetic pole pieces 125. The third component 120 modulates the first and second magnetic fields such that they interact in a geared manner. Consequently, torque can be transmitted between any two of the three components 110, 120, 130 in a geared manner, or between all three of them in a manner similar to an epicyclic mechanical gear arrangement. In a manner also similar to an epicyclic mechanical gear arrangement, the speed ratio between the components 110, 120, 130 can be varied by varying the speed at which the second magnetic field rotates. The speed at which the second magnetic field rotates is varied by varying the frequency of the current flowing in the windings 115 on the outer component 110. Consequently, torque can be transmitted between all three of the components 110, 120, 130 in a geared manner, with variable speed ratio.

Such a magnetic gearing arrangement as that shown in FIG. 1 can be used in a 'blended' electric hybrid vehicle. A blended electric hybrid vehicle is one in which mechanical power from the vehicle's engine is used to supplement electrical power from the vehicle's energy storage system at medium to high driving speeds. This is in contrast to other types of electric hybrid vehicles where the electrical power from the energy storage system is supplemented by mechanical power from the engine only when the battery has reached its minimum state of charge threshold.

In a blended electric hybrid vehicle, the inner component 130 typically transfers mechanical power to and from the wheels; the intermediate component 120 typically transfers mechanical power from the vehicle's engine; and the outer component 110 is stationary and typically transfers electrical power to and from the vehicle's energy storage system.

Advantageously, the speed ratio between the inner component 130 and the intermediate component 120 can be controlled in the way described above in order to provide a continuously variable transmission (CVT). This means that the engine is free to operate at its most efficient operating point since the speed of the inner component—that is, the output to the wheels—is essentially decoupled from the speed of the intermediate component—that is, the input from the engine. Consequently, the hybrid vehicle can meet wheel speed demands, without shifting the engine operating point out of its most efficient region.

The torque ratio in the electrical machine 100 remains unchanged, however. This is because the torque ratio is governed solely by the geometry of the mechanical gear system and the number of poles formed by the stator winding. Consequently, as the speed ratio varies, power is forced to flow in all three components 110, 120, 130 of the machine (assuming the speed of at least one of the components 120, 130 is non-zero). That means that power is forced to flow in the outer component 110—that is, electrical power is forced to flow through the windings 115 on the outer component 110. Accordingly, the electrical power flowing in to or out of the electrical machine 100 via the windings 115 on the outer component 110 is non-zero.

When the net electrical power flow in the electrical machine 100 is negative—that is, when the outer component 110 has to remove electrical power from the arrangement—the amount of electrical power that must be removed from the arrangement may be too much to store in the vehicle's limited capacity energy storage system. To manage the surplus power, the surplus is returned to the drive shaft at the output shaft speed to provide a fully balanced, 'islanded' power system. The surplus is returned to the drive shaft via a second electrical machine. Thus two electrical machines are provided on the power train, each having a respective inverter for controlling power flow and for transferring electrical power to and from the vehicle's energy storage system.

Though sophisticated, this approach has several shortcomings. One shortcoming is that the system is very complex as two electrical machines are needed. Another shortcoming is that each electrical machine requires its own inverter. Such complexity in the vehicle's power train is undesirable as it negatively impacts the cost of the vehicle and its size, weight, reliability and dynamic performance.

Accordingly, it is an object of at least some of embodiments of this invention to address these problems.

SUMMARY

According to one aspect, there is provided an electrical machine comprising: a first rotor, the first rotor producing a first magnetic field having a first number of pole pairs; a second rotor comprising a plurality of pole pieces, the plurality of pole pieces being arranged to modulate the first magnetic field to produce a second magnetic field having a second number of pole pairs; a stator comprising one or more windings arranged to produce a third magnetic field with the first number of pole pairs and the second number of pole pairs; wherein the interaction of the third magnetic field with the first number of pole pairs and the second number of pole pairs changes a torque ratio between the first rotor and the second rotor.

The first rotor may comprise a plurality of permanent magnets. The permanent magnets may be arranged to produce the first magnetic field.

The first rotor may comprise one or more rotor windings. The one or more rotor windings may be arranged to produce the first magnetic field.

Interaction of the third magnetic field with the first number of pole pairs and the second number of pole pairs may change the torque applied to each of the first rotor and the second rotor independent of the other and optionally according to a predetermined torque ratio.

The second rotor may be disposed between the first rotor and the stator.

The one or more windings may comprise a first set of windings and a second set of windings. The first set of windings may be arranged to interact with the second number of pole pairs, and the second set of windings may be arranged to interact with the first number of pole pairs.

The first set of windings may be arranged to produce a magnetic field having the second number of pole pairs.

The second set of windings may be arranged to produce a magnetic field having the first number of pole pairs.

The first rotor may be arranged to transmit mechanical power one of in to or out of the electrical machine, and the second rotor may be arranged to transmit mechanical power the other of in to or out of the electrical machine.

The first rotor and the second rotor may be arranged to transmit mechanical power in to the electrical machine.

The first rotor and the second rotor may be arranged to transmit mechanical power out of the electrical machine.

The first rotor, the second rotor and the stator are arranged to transfer torque in a geared manner.

The speed ratio and/or the torque ratio of the machine may be varied.

Varying the frequency of a current in the first set of windings may vary the speed ratio of the electrical machine.

Varying the speed at which the magnetic field produced by the first set of windings rotates may vary the speed ratio of the electrical machine.

Varying an amplitude and/or a phase angle of a current in the second set of windings may vary the torque ratio of the electrical machine. The phase angle may be measured relative to the first magnetic field.

The torque ratio and the speed ratio may be inversely varied such that the net electrical power supplied to the electrical machine is substantially zero.

The torque ratio and the speed ratio may be inversely varied such that the net electrical power supplied to the electrical machine from an external source is substantially zero.

The torque ratio may be increased such that the net electrical power supplied to the electrical machine is substantially positive.

The torque ratio may be increased such that the net electrical power supplied to the electrical machine from an external source is substantially positive.

The torque ratio may be decreased such that the net electrical power supplied to the electrical machine is substantially negative.

The torque ratio may be decreased such that the net electrical power supplied to the electrical machine from an external source is substantially negative.

The first number of pole pairs may be 9. The second number of pole pairs may be 6. There may be 15 pole pieces.

The stator may be arranged to transmit electrical power in to and/or out of the electrical machine via the one or more windings.

The stator may comprise a plurality of teeth. At least one tooth of the teeth may protrude radially inwards. The at least one tooth may carry the one or more windings.

The torque ratio and/or the speed ratio in the machine may be varied by varying the current in the one or more windings.

The one or more windings may be electrically coupled to a driver. The driver may be electrically coupled to a controller.

The one or more windings may be connected to an inverter. The inverter may be an AC/DC inverter. The inverter may be connected to a DC link. The DC link may be connected to an energy storage device. The energy storage device may comprise at least one of a battery, a capacitor and/or a fuel cell. The DC link may be connected to the energy storage device via a DC/DC converter. At least one other winding may be connected to the DC link via an AC/DC inverter.

The one or more windings may be connected to an AC/AC converter. The AC/AC converter may be a matrix converter. The AC/AC converter may be connected to an AC/DC converter. The AC/DC converted may be connected to the energy storage device via a DC/DC converter. At least one other winding may be connected to the AC/AC converter.

A non-sinusoidal current may be applied to the one or more windings. The non-sinusoidal current may be substantially cyclically repetitive to a common multiple of the first number of pole pairs and the second number of pole pairs. The multiple may be the lowest common multiple.

Each of the first set of windings and the second set of windings may be arranged to receive a separate current input.

The separate current input to each of the first set of windings and the second set of windings may be supplied by a separate driver.

The one or more windings may be a polyphase spatially distributed winding. A polyphase current may be applied to the polyphase spatially distributed winding.

The one or more windings may be a three phase spatially distributed winding. A polyphase current may be applied to the three phase spatially distributed winding. A three phase 120 degree displaced current may be applied to the three phase spatially distributed winding.

At least one of the first and the second sets of windings may be a polyphase spatially distributed winding. A polyphase current may be applied to the polyphase spatially distributed winding.

At least one of the first and the second sets of windings may be a three phase spatially distributed winding. A polyphase current may be applied to the three phase spatially distributed winding. A three phase 120 degree displaced current may be applied to the three phase spatially distributed winding.

The electrical machine may be used in a vehicle power train. The electrical machine may be used in a hybrid vehicle power train.

The second rotor may be connected to an input shaft. The input shaft may be connected to an engine.

The first rotor may be connected to an output shaft. The output shaft may be connected to a drive shaft and/or propeller shaft.

The electrical machine may be a linear electrical machine. The electrical machine may be an axial flux machine.

At least one of the plurality of pole pieces may be formed of non-magnetised material. At least one of the pole pieces may be formed of ferromagnetic material. At least one of the pole pieces may be formed of a plurality of axially-stacked laminations. At least one of the pole pieces may be formed of soft magnetic composite material.

In an embodiment, the first number of pole pairs is equal to the second number of pole pairs.

In an embodiment, the first number of pole pairs is more than the second number of pole pairs.

In an embodiment, the number of pole pieces is the sum of the first and second numbers of pole pairs.

In an embodiment, there is substantially no magnetic coupling between the first number of pole pairs and the second number of pole pairs.

Optional features of any aspect may also be optional features of any other aspect unless there is a clear technical incompatibility preventing this.

According to a second aspect, there is provided a method of operating an electrical machine according to the first aspect, the method comprising the step of: transmitting mechanical power in to and/or out of the electrical machine.

According to a third aspect, there is provided a computer means for operating an electrical machine according to the first aspect.

The computer means may be configured to receive at least one instruction indicative of at least one of a required speed and/or torque of the first rotor and/or a required speed and/or torque of the second rotor.

The computer means may be configured to calculate the required speed ratio and/or torque ratio between the first rotor, the second rotor and the stator based on the instruction.

The computer means may be configured to determine the properties of the current in at least one of the one or more windings on the stator for effecting the required speed ratio and/or torque ratio between the first rotor, the second rotor and the stator. The properties may be at least one of a phase angle, frequency, and/or amplitude of the current.

The computer means may be configured to provide a driver with an instruction indicative of the properties of the current in the at least one winding, the driver being arranged to supply the current.

The driver may be electrically coupled to a controller. The controller may comprise the computer means.

The computer means may be configured to provide the driver with an instruction indicative of the properties of the current in the at least one winding.

The instruction may be indicative of at least one of a required frequency, amplitude and/or phase angle of the current to be applied.

BRIEF DESCRIPTION OF THE DRAWINGS

Specific embodiments in which the invention is embodied are described below by way of example only and with reference to the accompanying drawings, in which.

DETAILED DESCRIPTION OF THE DRAWINGS

The Apparatus

Figure 2:
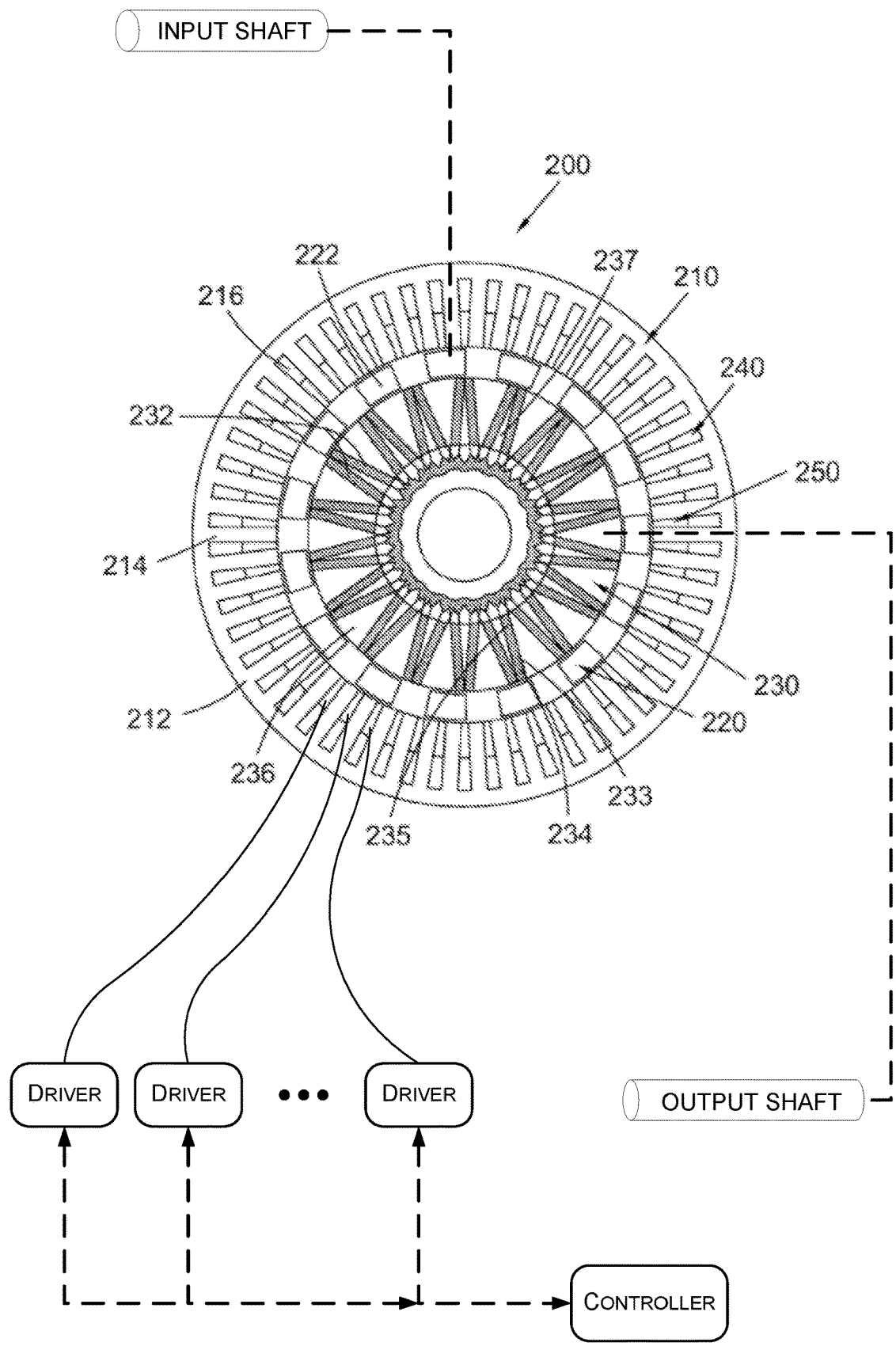
FIG. 2 is an axial view of components of an electrical machine that is a first embodiment.

FIG. 2 shows a magnetically geared radial field machine 200 of a first embodiment. The machine 200 can be used in either a motoring or a generating mode and can be used in a number of different power train arrangements (not shown), for example in the powertrain of a blended hybrid electric vehicle.

The machine 200 has an external stator 210, a pole piece rotor 220 and an internal rotor 230. The stator 210, internal rotor 230 and pole piece rotor 220 are annular in shape and are coaxially mounted such that the stator 210 forms a ring around the pole piece rotor 220, and the pole piece rotor 220 forms a ring around the internal rotor 230. In other words, the internal rotor 230 is radially inner to the pole piece rotor 220, and the pole piece rotor 220 is radially inner to the external stator 210. Each of these will now be described in turn.

The stator 210 is similar to a conventional electrical machine stator, except for the configuration and operation of its windings. The stator 210 is formed from laminations of electrical steel, the laminations being in a plane perpendicular to the axis of the machine. The stator 210 is a slotted stator. The stator 210 is shaped so as to have a radially outer annular body 212 from which project radially inwardly 54 teeth 214. The teeth 214 are evenly spaced around the body 212 with slots 216 between adjacent teeth 214 for receiving a first set of windings 240 and a second set of windings 250. As there are 54 teeth 214 in this embodiment, there are 54 slots 216. The first set of windings 240 are radially in between the outer annular body 212 of the stator 210 and the second set of windings 250, in the slot 216. The first set of windings 240 and the second set of windings 250 are three phase windings. The exact winding patterns of the first set of windings 240 and the second set of windings 250 will be now be described in reference to FIGS. 3 and 4, respectively.

Figure 3:
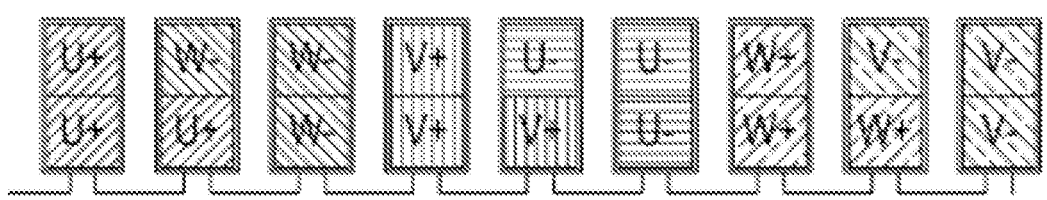
FIG. 3 is a winding pattern for the first set of windings on the stator of the electrical machine of FIG. 2.

The first set of windings 240 are wound in the slots 216 according to the winding pattern shown in FIG. 3. FIG. 3 shows 9 adjacent blocks. Each block represents a slot 216 of the stator 210. Each block has two of the letters U, V and W stacked one on top of the other. The letters U, V and W each represent a phase winding of the first set of windings 240, respectively. For example, U may represent a first phase; W a second phase; and V a third phase. Each letter has a positive '+', or a negative '−' sign after it. The positive sign represents that the current in the respective phase winding is flowing in a direction perpendicular to the page and out of the page. The negative sign represents that the current in the respective winding is flowing in a direction perpendicular to the page and into the page. All three phases complete a full coil, or wind, over 9 adjacent slots 216. This pattern is repeated 6 times to define the first set of windings 240 in the 54 slots 216 of the stator 210. Consequently, when a three phase 120 degree displaced current is applied to the first set of windings 240, the magnetic field created in the air gap between the stator 210 and the pole piece rotor 220 has 6 pole pairs. This is because the winding pattern in FIG. 3 is repeated 6 times around the circumference of the stator 210.

As the skilled person would understand, the winding pattern shown in FIG. 3 for the first set of windings 240 is a fractional-slot winding pattern. This is because the number of slots 216 per magnetic pole and electrical phase is a fraction. Specifically, the winding pattern in FIG. 3 is fractional slot winding pattern because the stator 210 has 54 slots 216; the magnetic field set up by the first set of windings 240 has 12 poles (6 pole pairs); and the number of phases is 3. Therefore the number of slots 216 per pole and phase is 1.5.

Figure 4:
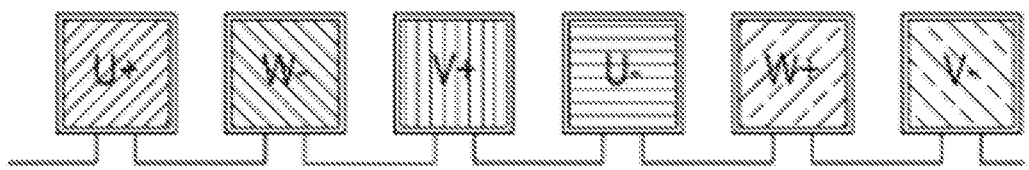
FIG. 4 is a winding pattern for the second set of windings on the stator of the electrical machine of FIG. 2.

The second set of windings 250 is wound in the slots 216 according to the winding pattern shown in FIG. 4, which follows the same format as FIG. 3. In this case though, FIG. 4 shows only 6 adjacent blocks. This is because all three phases of the second set of windings 250 complete a full wind, or coil, over 6 adjacent blocks or slots 216. This pattern is therefore repeated 9 times to define the second set of windings 250 in each of the 54 slots 216 in the stator 210. Consequently, when a three phase 120 degree displaced current is applied to the second set of windings 250, the magnetic field created in the air gap between the stator 210 and the pole piece rotor 220 has 9 pole pairs.

As the skilled person would understand, the winding pattern shown in FIG. 4 for the second set of windings 250 is an integral slot (or integer slot) winding pattern. This is because the number of slots 216 per magnetic pole and electrical phase is an integer. Specifically, the winding pattern in FIG. 4 is an integral slot winding pattern because the stator 210 has 54 slots; the magnetic field set up by the second set of windings 250 has 18 poles (9 pole pairs); and the number of phases is 3. Therefore the number of slots 216 per pole and phase is 1.

In alternative embodiments, any combination of winding patterns for the first 240 and second 250 sets of windings can be used, provided the magnetic fields generated by the first 240 and second 250 sets of windings do not interact with one another. Each set of windings may be any of an integral slot winding; a fractional-slot winding pattern; a concentrated fractional-slot winding; or a distributed fractional-slot winding.

In alternative embodiments, the stator 210 has 108 slots 216. In this embodiment, the second set of windings 250 occupies half of the 108 slots 216, and the first set of windings 240 occupies each one of the slots 216. In this embodiment, both the first 240 and the second 250 sets of windings are integral slot windings. The magnetic fields generated by the first and second sets of windings do not however interact as the first set of windings has 1.5 times as many pole pairs as the second set of windings. In other words, the magnetic fields generated by the first and second sets of windings do not interact because there is a non-integer multiple between their respective number of pole pairs.

With further reference to FIG. 2, the pole piece rotor 220 is formed from a non-magnetic and non-conductive annular shaped retaining structure (not shown). The retaining structure is shaped so as to have a number of slots which extend through the body of the retaining structure in a direction parallel to the axis of the machine. The slots are evenly spaced around the circumference of the retaining structure. Each slot is arranged to retain a pole piece 222 of ferromagnetic material, such as electrical steel. The pole pieces 222 are unmagnetized when the machine 200 is not operating. In this embodiment, the retaining structure has 15 slots spaced evenly around the circumference of the retaining structure. Accordingly, the retaining structure retains 15 pole pieces 222. In use, the pole piece rotor 220 is connected to an input shaft for transmitting mechanical power into the machine. The input shaft may be connected to a conventional engine or any other prime-mover.

In further reference to FIG. 2, the internal rotor 230 has 18 permanent magnet pairs 232 arranged around its radially outermost surface. Each permanent magnet pair 232 is created by splitting a single permanent magnet in half. Each permanent magnet 233 in each permanent magnet pair has a first end 234 and a second end 235. The first end is at the radially outer surface of the internal rotor 230. The second end 235 is disposed radially inwards from the first end 234. The first ends 234 of the two permanent magnets 233 in each pair 232 may be in contact with one another. The second ends 235 of the two permanent magnets 233 in each pair 232 may be respectively in contact with the second end 235 of the permanent magnet 233 adjacent to them which doesn't belong to the same permanent magnet pair 232. First wedges 236 are circumferentially disposed between the first ends 234 of each permanent magnet pair 232 and the first ends 234 of the adjacent permanent magnet pair 232. Second wedges 237 are circumferentially disposed between the second ends 235 of the permanent magnets 233 in each permanent magnet pair 234. At least one of the first or second wedges 236, 237 may be made of steel.

Advantageously, the time taken to manufacture internal rotor 230 is reduced compared to other approaches because the permanent magnets 233 are mechanically fastened in place on the rotor 230 by the wedges 236, 237, and not fastened by means such as glue which require setting or drying time. As the skilled person would understand, if a fastening means such as glue is used, each permanent magnet must be glued on to the rotor—and the glue allowed to set—before another permanent magnet is brought into proximity with it. This must be done to avoid the permanent magnet or magnets which are glued to the rotor from becoming dislodged due to attractive or repulsive forces with other permanent magnets being positioned on the rotor. This results in a much slower manufacturing process than that for internal rotor 230 where each permanent magnet 233 is mechanically fastened in place in quick succession by its respective positioning with wedges 236, 237.

In some embodiments of the internal rotor 230 shown in FIG. 2, the permanent magnets 233 may be fastened in place on the internal rotor 230 by both the wedges 236, 237 and by glue. Advantageously, the glue limits the movement of the permanent magnets 233 relative to the wedges 236, 237 when the machine 200 is in operation. In other words, it prevents each permanent magnet 233 from rattling in the hole created by its respective restraining wedges 236, 237 when the machine 200 is in operation. Further advantageously, the time taken to manufacture the internal rotor 230 is still reduced compared to using glue only as a method for fastening the permanent magnets 233 to the internal rotor 230. This is because the permanent magnets 233 are primarily restrained by the wedges 236, 237 and so it is not necessary for each permanent magnet to be glued on to the rotor—and the glue allowed to set—before another permanent magnet is brought into proximity with it. Instead, the permanent magnets 233 may be fastened in faster succession, as described above.

The permanent magnet pairs 232 are arranged such that the polarity of adjacent magnetic fields set up by adjacent permanent magnet pairs 232 alternates around the circumference of the internal rotor 230. The permanent magnet pairs 232 provide a radial magnetic field (not shown) in the air gap between the internal rotor 230 and the pole piece rotor 220. The magnetic field has 9 pole pairs because it is provided by 18 permanent magnet pairs. The magnetic flux in the air gap between the internal rotor 230 and the pole piece rotor 220 therefore has a fundamental $9^{th}$ harmonic. The $9^{th}$ harmonic corresponds to 9 pole pairs. In use, the internal rotor 230 is connected to an output shaft for transmitting mechanical power in to and/or out of the machine. The output shaft may be connected to a drive shaft and/or a propeller shaft.

Figure 5:
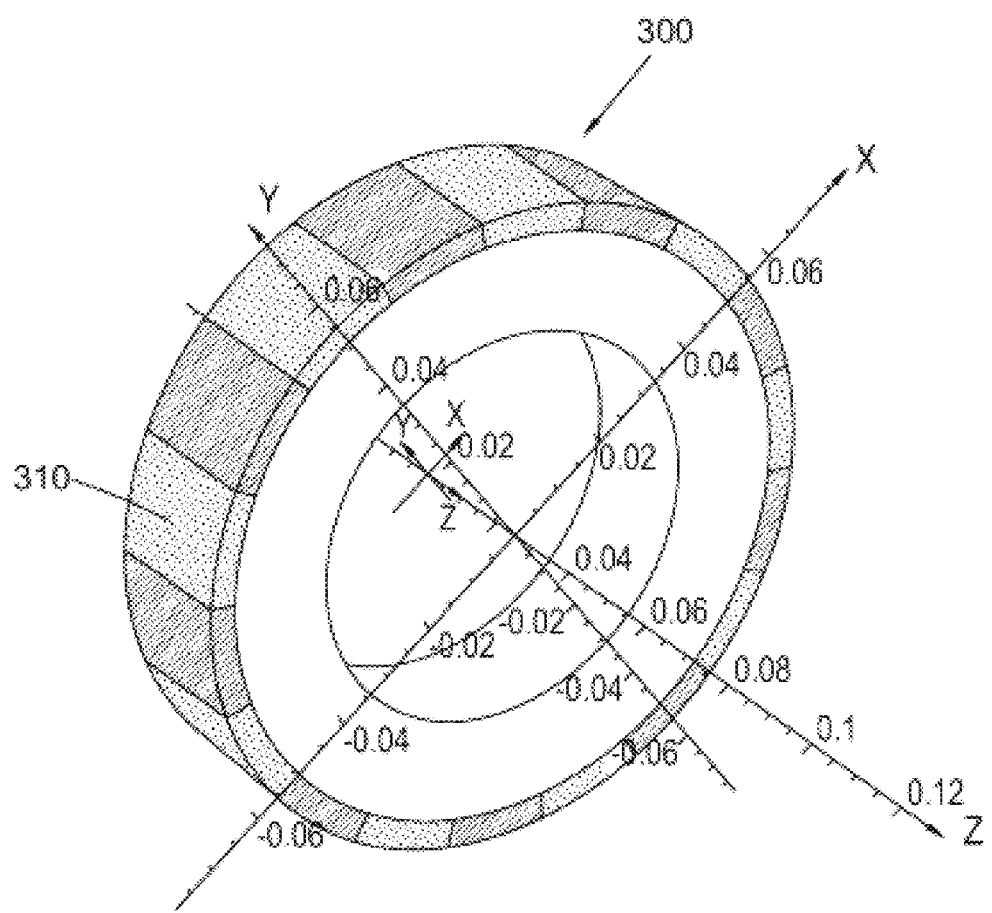
FIG. 5 is an isometric view of the internal rotor which may be substituted for the internal rotor in the electrical machine of FIG. 2.

In alternative embodiments, the internal rotor 300 shown in FIG. 5 may be substituted for the internal rotor 230 in the machine 200. The rotor 300 is annular in shape. The rotor 300 has 18 permanent magnets 310 arranged individually around its radially outermost surface. The 18 permanent magnets are arranged such that the polarity of adjacent magnetic fields set up by adjacent permanent magnets alternates around the circumference of the internal rotor 230. Accordingly, the rotor 300 provides a radial magnetic field (not shown) in the space radially outside the permanent magnets 310. The magnetic field in the alternative embodiment also has 9 pole pairs because it is provided by 18 permanent magnets. The radial magnetic field has substantially the same properties as the radial magnetic field described in the preceding paragraph with reference to internal rotor 230. Consequently, any part of this disclosure disclosed with respect to internal rotor 300 may be considered as applying equally well to internal rotor 230, and vice versa.

Figure 6:
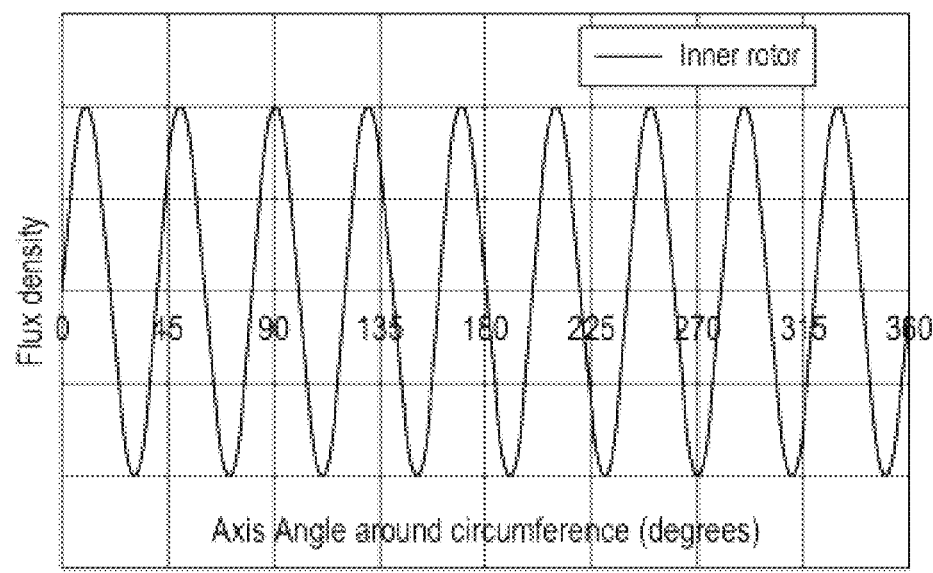
FIG. 6 is a graph which shows how the density of magnetic flux at the air gap or area adjacent to the rotor in the electrical machine 200 varies with angular position.

FIG. 6 is a graph illustrating the approximate relationship between the angular position around the axis of the electrical machine 200 and the density of the magnetic flux in the air gap between the pole piece rotor 220 and the rotor 300. As the skilled person would understand, the flux density alternates in a sinusoidal manner between positive and negative values of flux with angular position around the axis. The positive values represent magnetic north poles. The negative values represent magnetic south poles. The sinusoid repeats itself every 40 degrees. This is because the magnetic flux is the result of the magnetic field provided by the 18 adjacent permanent magnets 310 on the rotor 300. As a result, the magnetic field varies from positive to negative—that is, from north to south poles—18 times around the axis of the rotor. Hence the sinusoid has a period of 40 degrees because 360 degrees divided by 9 (pole pairs) is equal to 40 degrees.

In further reference to FIG. 2, the pole pieces 222 retained by the pole piece rotor 220 act—in effect—as flux gates to the magnetic flux in the air gap between the internal rotor 230 and the pole piece rotor 220. As described above, this magnetic flux is the result of the magnetic field provided by the permanent magnets 233 on the internal rotor 230. As would be understood, a portion of the magnetic flux provided by the internal rotor 230 in the air gap between the pole piece rotor 220 and the internal rotor 230 passes through the pole piece rotor 220. The portion that is able to pass through the pole piece rotor 220 depends upon the position of the magnetic flux in the air gap in relation to a pole piece 222 of the pole piece rotor 220. Magnetic flux which is radially in between a pole piece 222 of the pole piece rotor 220 and the internal rotor 230, at a given angular position around the axis of the pole piece rotor 220, passes through the pole piece rotor 220. Conversely, the magnetic flux which is not radially between a pole piece 222 of the pole piece rotor 220 and the internal rotor 230, at a given angular position, is substantially blocked by the pole piece retaining structure and does not appear at the radially outermost surface of the pole piece rotor 220. This is because the pole piece retaining structure is magnetically impermeable.

The magnetic flux that passes through and appears at the radially outermost surface of the pole piece rotor 220 can be considered as a modulated version of the magnetic flux provided by the internal rotor 230. Accordingly, the magnetic field in the air gap between the stator 210 and the pole piece rotor 220 is a modulated version of the magnetic field in the air gap between the internal rotor 230 and the pole piece rotor 220.

Figure 7:
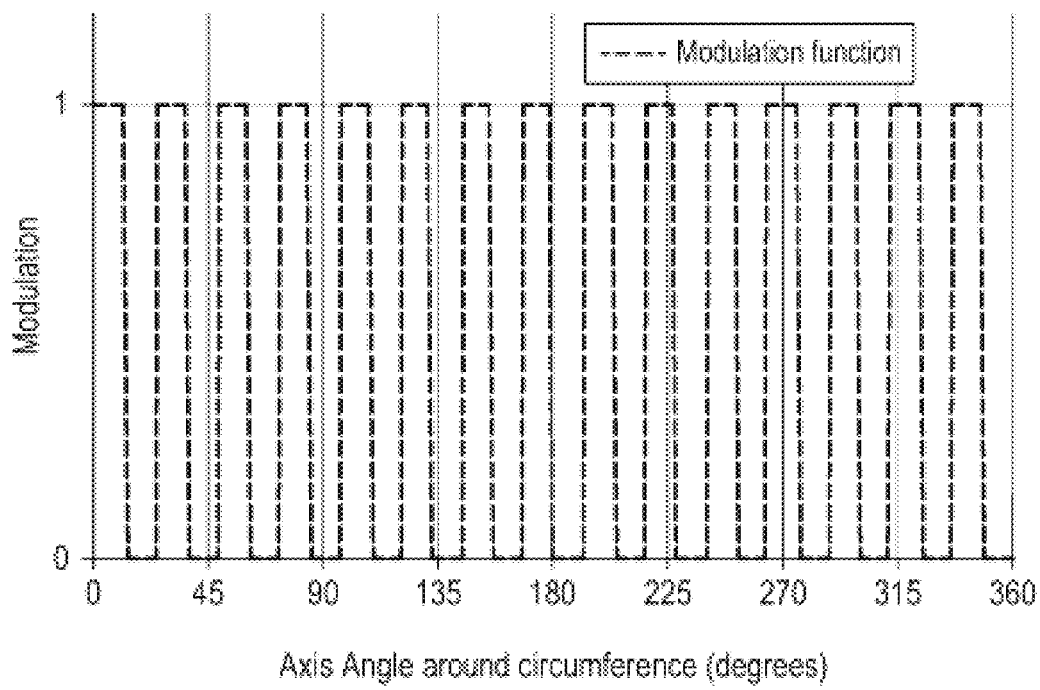
FIG. 7 is a graph which shows the idealised modulation function applied by the pole pieces of FIG. 2.

FIG. 7 is a graph illustrating the idealised modulation function applied by the pole pieces 222 of the pole piece rotor 220 on the magnetic flux produced by the internal rotor 230 in the air gap between the internal rotor 230 and the pole piece rotor 220. The pattern of magnetic flux which appears at the radially outermost surface of the pole piece rotor 220 is the product of the modulation function and the magnetic flux produced by the internal rotor 230. The y-axis shows the function applied to the magnetic flux. The x-axis shows the angular position around the axis of the pole piece rotor 220. The graph shows that as the angular position varies, the modulation function is a square wave. The square wave is cyclically repetitive approximately every 24 degrees. The upper value of the square wave is 1. The lower value of the square wave is 0. The upper value, 1, represents an angular position about the axis of the pole piece rotor 220 where there is a pole piece 222 and thus a position where magnetic flux is permitted to permeate through the pole piece rotor 220 to the air gap between the pole piece rotor 220 and the stator 210. The lower value, 0, represents an angular position around the axis of the pole piece rotor 220 where there is not a pole piece 222, and thus a position where magnetic flux is not permitted to permeate through the pole piece rotor 220. In theory, the magnetic flux which appears at the radially outermost surface of the pole piece rotor 220 therefore has a fundamental $6^{th}$ harmonic. This corresponds to a magnetic field with 6 pole pairs. This is because of the theoretical relationship shown in the following equation:

$$Ns = Npp - Nr \qquad \text{Equation 1}$$

where Ns is the number of pole pairs of the modulated field; Npp is the number of pole pieces 222; and Nr is the number of pole pairs of the magnetic field provided by the rotor. Hence, when the number of pole pieces is 15 and the number of pole pairs in the magnetic field set up by the rotor is 9, the number of pole pairs in the modulated field is 6.

As mentioned, the modulation function illustrated in FIG. 7 is idealised. In practice however, the actual modulation function will deviate from the idealised modulation function. This may be because the pole pieces 222 of the pole piece rotor 220 may become saturated by magnetic flux, magnetic flux may be leaking between pole pieces 222 and/or due to the practical geometry of the pole pieces 222.

Figure 8:
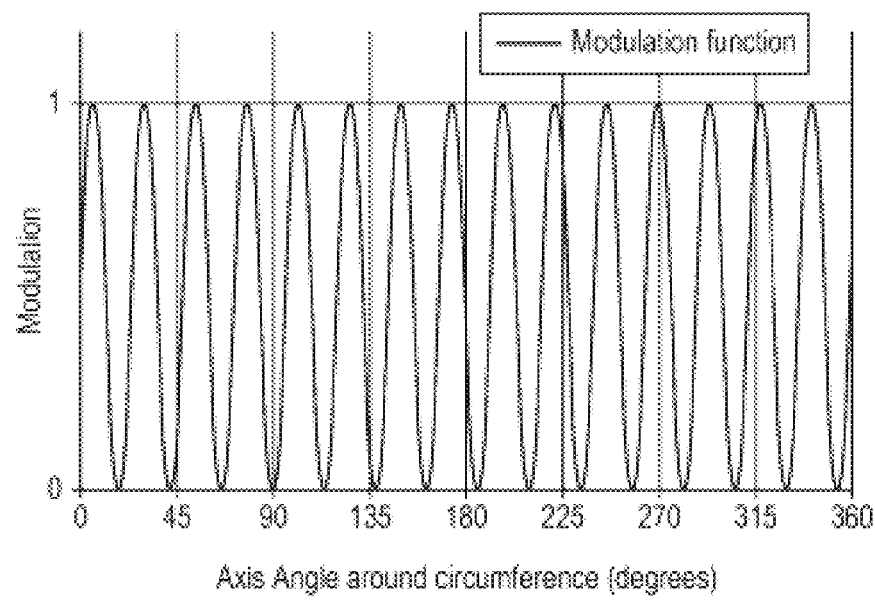
FIG. 8 is a graph which approximates the actual modulation function applied by the pole pieces of FIG. 2.

FIG. 8 illustrates a theoretical modulation function better representative of the actual modulation function applied by the pole pieces 222 of the pole piece rotor 220 on the magnetic flux provided by the internal rotor 230 in the air gap between the internal rotor 230 and the pole piece rotor 220. As for FIG. 7, the magnetic flux which appears at the radially outermost surface of the pole piece rotor 220 is the product of the modulation function and the magnetic flux provided by the internal rotor 230 in the air gap. The y-axis shows the function applied to the magnetic flux. The x-axis shows the angular position around the axis of the pole piece rotor 220. The modulation function is a sine wave. The sine wave is cyclically repetitive approximately every 24 degrees. The upper value of the sine wave is 1. The lower value of the sine wave is 0. Because the modulation function involves a sine term, the magnetic flux which appears at the radially outermost surface of the pole piece rotor 220 has a plurality of harmonic components, rather than just the $6^{th}$ harmonic. In the case illustrated by FIG. 8, one of the components is a $6^{th}$ harmonic. Another of the components is a $9^{th}$ harmonic, as explained below. The magnetic field at the radially outermost surface of the pole piece rotor 220 therefore has a 6 pole pair component and a 9 pole pair component.

The modulation function discussed in reference to FIG. 8 is represented by the following equation:

$$\text{Modulation} = \frac{\sin[15(\theta + \omega_{poles}t)]}{2} + \frac{1}{2} \qquad \text{Equation 2}$$

where $\omega_{poles}$ is the rotational speed of the pole piece rotor 220 in radians per second; $\theta$ is the angular position around the axis of the pole piece rotor 220 in radians; and t is time in seconds.

As noted above, the pattern of the magnetic flux which appears at the radially outermost surface of the pole piece rotor 220 is the product of the magnetic flux provided by the internal rotor 230 and the modulation function. The pattern of the magnetic flux which appears at the radially outermost surface of the pole piece rotor 220 is therefore represented by the following equation:

$$B_{outer} = \{\hat{B}\sin[9(\theta + \omega_{inner}t)]\} \times \left\{\frac{\sin[15(\theta + \omega_{poles}t)]}{2} + \frac{1}{2}\right\} \qquad \text{Equation 3}$$

where B is the flux density in Tesla; $\theta$ is the angular position around the axis of the internal rotor 230 in radians; $\omega_{inner}$ is the rotational speed of the internal rotor 230 in radials per second.

Equation 3 can be expanded using the following standard trigonometric identity to view the various harmonic components of the flux density:

$$\sin(\alpha) \times \sin(\beta) = \frac{\cos(\alpha - \beta) - \cos(\alpha + \beta)}{2} \qquad \text{Equation 4}$$

The expanded form of Equation 3 is as follows:

$$B_{outer} = \frac{1}{4}\hat{B}\cos\left[-6\left(\theta - \frac{9\omega_{inner}t}{6} + \frac{15\omega_{poles}t}{6}\right)\right]\ldots -$$
$$\frac{1}{4}\hat{B}\cos\left[24\left(\theta - \frac{9\omega_{inner}t}{24} + \frac{15\omega_{poles}t}{24}\right)\right]\ldots +$$
$$\frac{1}{2}\hat{B}\sin[9(\theta + \omega_{inner}t)] \qquad \text{Equation 5}$$

The magnetic flux which appears at the radially outermost surface of the pole piece rotor 220, as defined by Equation 5, therefore has three harmonic components because there are three trigonometric terms: a first which corresponds to the $6^{th}$ harmonic order; a second which corresponds to the $24^{th}$ harmonic order; and a third which corresponds to the $9^{th}$ harmonic order. The relative magnitudes of the three components are shown by the scalar at the front of each trigonometric term. In this case, the magnitude of the $9^{th}$ harmonic (½) is greater than that of the $6^{th}$ (¼) and $24^{th}$ (¼) harmonics. The magnitudes of the $6^{th}$ and $24^{th}$ harmonics are the same.

Figure 9:
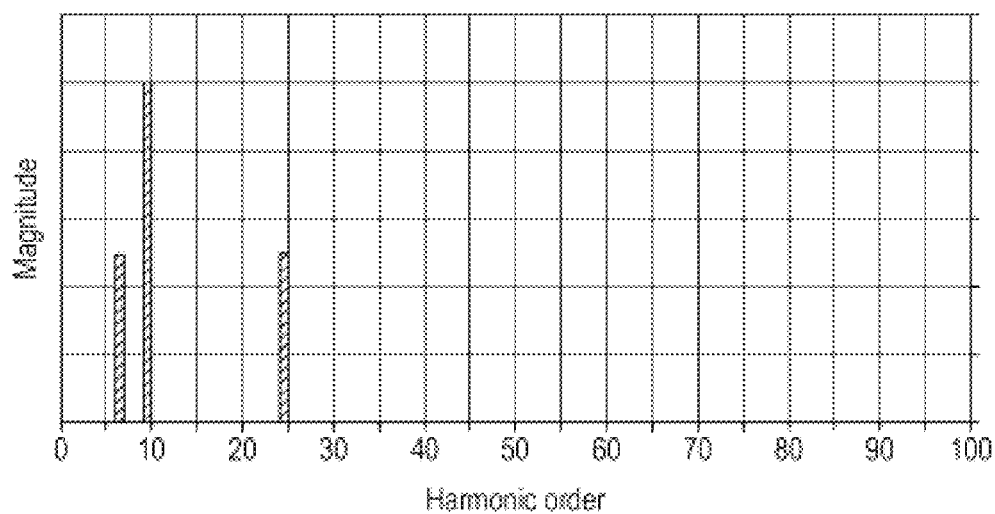
FIG. 9 is a graph which shows the harmonic content of the modulated magnetic flux in the electrical machine of FIG. 2 at the air gap adjacent to the inner surface of the stator.

FIG. 9 is a graph illustrating the harmonic content of the magnetic flux described in relation to Equation 5. As discussed, this is the magnetic flux which appears at the radially outermost surface of the pole piece rotor 220 as a result of the application of the modulation function discussed in reference to FIG. 8 and Equation 2. The y-axis of the graph is the magnitude of the harmonic. The x-axis is the harmonic order. In line with Equation 5, peaks are shown on the graph for the $6^{th}$, $9^{th}$ and $24^{th}$ harmonics. Also in line with Equation 5, the magnitude of the $9^{th}$ harmonic order in the magnetic flux is greater than the magnitudes of the $6^{th}$ and $24^{th}$ harmonics. The magnitude of the $24^{th}$ harmonic order in the magnetic flux is the same as the magnitude of the $6^{th}$ harmonic order. The $6^{th}$, $9^{th}$ and $24^{th}$ harmonic orders correspond to magnetic fields with 6, 9 and 24 pole pairs, respectively.

In practice, the relative magnitudes of the various harmonic components of the flux density will vary from the relationships shown in FIG. 9 and described in Equation 5. This is because the relative magnitudes are also affected by a number of other factors, including any one of: the size of the air gaps between the components 210, 230, 240 of the machine 200; the size of the permanent magnets 233; the shape of the permanent magnets 233; the size of the pole pieces 222; and the shape of the pole pieces 222. The relative magnitudes of the various harmonic components will also vary from the relationships shown in FIG. 9 and described in Equation 5 because higher order harmonics, such as the $24^{th}$ harmonic order, typically have lower field penetration depth values than lower order harmonics. Accordingly, higher order harmonics may effectively disappear at shorter distances from flux producing members than lower order harmonics. In other words, the magnitude of higher order harmonics reduces more quickly across an air gap than lower order harmonics.

The machine 200 has an intrinsic gear ratio. The intrinsic gear ratio may be defined as the ratio of speed between any two of the internal rotor 230, the pole piece rotor 220 and the magnetic field set up by the first set of windings 250, when the other of the internal rotor 230, the pole piece rotor 220 and the magnetic field set up by the first set of windings 250 is held stationary.

In this embodiment, the intrinsic gear ratio of the machine 200 is the ratio of the number of pole pieces 222 to the number of pole pairs in the magnetic field set up by the permanent magnets 233. As would be clear to the skilled person, in this embodiment, the intrinsic ratio of the machine 200 is therefore 15/9.

Consequently, and by way of example only, when the electrical machine 200 is operated at its intrinsic ratio, if the speed and input torque of the pole piece rotor 220 are 1000 RPM and 100 Nm respectively, the speed and output torque of the internal rotor 230 will be 1667 RPM and 60 Nm.

In alternative embodiments, the machine 200 has a different intrinsic ratio.

In this disclosure, torque ratio is the ratio between torque input to the machine 200 and torque output from the machine 200.

In this disclosure, speed ratio is the ratio between output speed and input speed.

MODES OF OPERATION

With continued reference to FIG. 2, some modes of operation of the electrical machine 200 will now be described.

In all modes, each of the first set of windings 240 and the second set of windings 250 is connected to a respective motor driver (not shown). As the skilled person would understand, a motor driver can be used to set the magnitude, frequency, and the form factor (i.e. the shape of the wave) of a current supplied to windings. In the following modes of operation, each driver is for supplying current to its respective set of windings at the appropriate amplitude and frequency. Each driver may provide its respective set of windings with a three phase 120 degree displaced current. The frequency of the current is synchronous with the rotational speed of the internal rotor 230. A controller (not shown) provides instructions to the drivers. Each driver is provided with instructions about the properties of the current to be supplied to the driver's respective set of windings. By controlling the current in each set of windings 240, 250 independently of the other, the speed ratio and the torque ratio between the stator 210, the pole piece rotor 220 and the internal rotor 230 are independently controlled.

In alternative embodiments, each driver additionally sets the form of the current applied to its respective set of windings. The form of the current may be controlled so that the current is substantially a sine wave, substantially a square wave or substantially a complex wave. Other forms of current may also be used.

In one mode of operation, the electrical machine 200 operates in a pure electric motoring mode. In this mode, neither the speed nor the torque ratios are varied. This mode is described to aid understanding of how the various magnetic fields in the electrical machine 200 interact.

In this mode, a current is supplied to the second set of windings 250. The windings 250 produce a magnetic field having 9 pole pairs. This magnetic field is produced in the air gap between the stator 210 and the pole piece rotor 220. The corresponding magnetic flux of this magnetic field therefore has a fundamental $9^{th}$ harmonic. As the skilled person would understand, the magnetic field produced by the second set of windings 250 locks on to the $9^{th}$ harmonic of the magnetic field provided by the internal rotor 230 and which appears at the radially outermost surface of the pole piece rotor 220.

In a manner of operation in this mode, the phase angle and the magnitude of the current in the second set of windings 250 are controlled such that the magnetic field produced by the second set of windings 250 'leads' the magnetic field set up by the permanent magnets 233. That is, the current in the second set of windings 250 is controlled so that the magnetic field produced by the second set of windings 250 rotates around the machine ahead of the magnetic field provided by the internal rotor 230. In other words, the magnetic field provided by the internal rotor 230 attempts to catch up with the magnetic field produced by the second set of windings 250. The non-zero phase angle between the magnetic fields results in torque being transferred to the internal rotor 230. The transfer of torque to the internal rotor 230 causes the internal rotor 230 to rotate in a first direction. Consequently, power is transferred between the stator 210 and the internal rotor 230 via the $9^{th}$ harmonic.

In a first mode of operation in accordance with an embodiment of this disclosure, the electrical machine 200 is controlled to operate in a "power balance" mode. Advantageously, in this mode—and indeed in all the subsequently discussed modes of operation—the torque ratio between the components of the electrical machine 200 is varied.

In the first mode, the speed ratio and the torque ratio are inversely varied with respect to one and other such that the total electrical power supplied to the electrical machine 200 is zero. Advantageously, there is therefore no requirement to have a separate traction motor to return electrical power removed from the machine 200 to the mechanical drive train since no electrical power is removed from the machine.

Accordingly, a much simplified, lighter, less expensive and compact power train is provided. The first mode of operation of the electrical machine 200 in the first mode will now be described in detail.

In the first mode, a current is applied to the first set of windings 240. As previously described, the winding pattern of the first set of windings 240 is repeated 6 times, and as such a magnetic field is produced with 6 pole pairs in the air gap between the stator 210 and the pole piece rotor 220. The corresponding magnetic flux has a fundamental $6^{th}$ harmonic. As the skilled person would understand, the magnetic field produced by the first set of windings 240 locks on to and/or interacts with the $6^{th}$ harmonic of the modulated permanent magnet magnetic field that appears at the outer circumference of the pole piece rotor 220.

In the first mode, mechanical power is input to the electrical machine 200 via the pole piece rotor 220. The pole piece rotor 220 may be connected to an input shaft. The input shaft may be connected to and driven by a conventional engine or other prime mover. The frequency of the current in the first set of windings 240 may be controlled so that the magnetic field it produces is held stationary (i.e. does not rotate). When the pole piece rotor 220 is made to rotate, a rotating magnetic field appears at the radially inner surface of the pole piece rotor 220 which has 9 pole pairs. The rotating magnetic field is produced by the modulation of the 6 pole pair magnetic field, produced by the first set of windings 240, by the pole pieces 222. As the skilled person would understand, the rotating magnetic field causes the permanent magnets 233 on the internal rotor 230 to rotate since both the rotating magnetic field and the magnetic field produced by the permanent magnets 233 have 9 pole pairs. Consequently, the two fields lock on to one another and all of the power, minus any losses, input to the machine 200 via the pole piece rotor 220 is transferred to the internal rotor 230. Consequently, torque is transferred to the internal rotor 230 via interaction between the $6^{th}$ and $9^{th}$ harmonics by virtue of the pole pieces "converting" the 6 pole pairs from the magnetic field generated by the first set of windings 240 to 9 pole pairs. Because the magnetic field generated by the first set of windings 240 is held stationary, the internal rotor 230 rotates with a fixed speed ratio. This is because, as would be clear to the skilled person, in this case the speed ratio is fully defined by the intrinsic gear ratio of the machine. The internal rotor 230 also rotates with a fixed torque ratio. As discussed below, the torque ratio is also fully defined by the intrinsic gear ratio of the machine.

Figure 1:
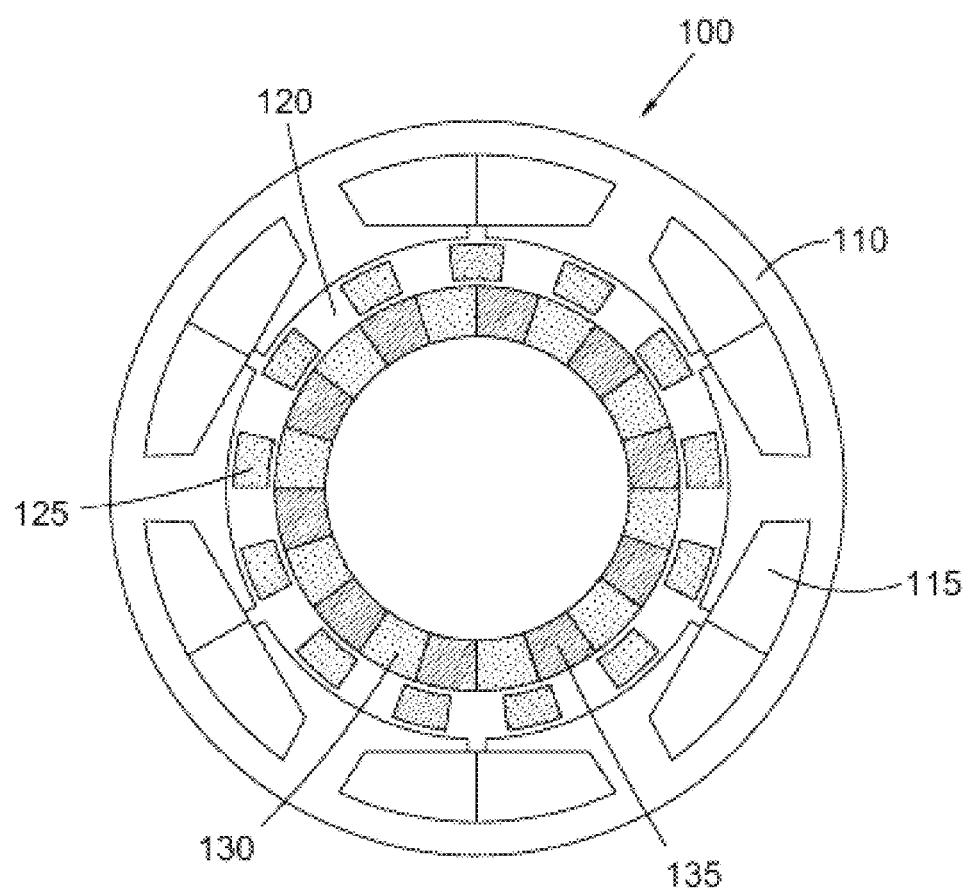
FIG. 1 is an axial view of components of a prior art magnetically geared radial field machine.

The magnetic field produced by the first set of windings 240 can however be made to rotate by varying the frequency of the current in the first set of windings 240. This causes the speed ratio between the components in the electrical machine 200 to vary in a known way from the intrinsic gear ratio of the machine. The torque ratio remains fixed, however, because, as previously described in reference to the magnetic gear in FIG. 1, when torque is transferred between the members in this way, the torque ratio is inherently defined by the geometry of the machine (the intrinsic gear ratio of the machine). Consequently, electrical power is made to flow in to or out of the machine. The direction in which the electrical power is made to flow depends upon the exact operating conditions of the machine. When for example the speed ratio is increased, electrical power is made to flow into the machine via the first set of windings 240. When however the speed ratio is decreased, electrical power is made to flow out of the machine via the first set of windings 240. Advantageously, in the first mode, a current is also applied to the second set of windings 250 such that an equal and opposite amount of electrical power is made to flow in to or out of the machine via the second set of windings 250. This balances the electrical power which flows in to or out of the machine 200 via the first set of windings 240. The electrical power flow is balanced by applying a current in the second set of windings 250 to transfer torque directly to the internal rotor 230 via the $9^{th}$ harmonic. The torque applied to the internal rotor 230 via the $9^{th}$ harmonic is independent of that transferred to it via the interaction between the $6^{th}$ and $9^{th}$ harmonics. Consequently, the torque ratio between the components in the machine 200 is no longer fixed. Instead, the torque ratio between the components in the machine 200 is made to vary inversely with the speed ratio such that the total electrical power supplied to the machine 200 is zero. Consequently, the speed ratio and the torque ratio are no longer fully defined by the intrinsic ratio of the machine.

In a second mode of operation, according to another embodiment, the electrical machine 200 operates in a "power boost mode". In this mode, the torque on the internal rotor 230 is boosted above that which would occur at the intrinsic ratio. As described above, the net electrical power flow into the machine 200 is dependent on the speed ratio. For speed ratios giving an output speed on the internal rotor 230 which is greater than that defined by the intrinsic ratio i.e. when the speed ratio is increased, the electrical power supplied to the first set of windings 240 is positive. This is because electrical power is flowing into the electrical machine from the driver(s). In order to boost the output torque of the internal rotor 230, the second set of windings 250 are also operated with a positive electrical power flow to provide motoring torque to the internal rotor 230. The total electrical power supplied to the machine 200 is the sum of these two positive contributions. Conversely for speed ratios giving output speed less than that which would occur at the intrinsic ratio i.e. when the speed ratio is decreased, the first set of windings 240 return electrical power from the machine 200 to the drivers. However, in order to boost the torque on the internal rotor 230, the second set of windings 250 are operated with a positive electrical power flow to provide motoring torque to the internal rotor 230. The total electrical power supplied to the machine 200 is the sum of these two competing contributions and may be net positive or negative or zero. If the total electrical power supplied to the machine 200 is net zero then the machine 200 is operating in the first mode of operation described above.

In short, in the power boost mode, the mechanical power throughput of the machine, which is transferred via the interaction between the $6^{th}$ and $9^{th}$ harmonic components of the magnetic flux, is essentially supplemented by electrical power (although the net electrical power into the electrical machine 200 may be negative, as described). The extra electrical power is fed into the machine 200 via the second set of windings 250.

In operation in the second mode, torque is transferred between the components of the machine 200 via the interaction between the $6^{th}$ and $9^{th}$ harmonics as it was in the first mode. Also in similarity with the first mode, the speed ratio between the components may be varied by varying the frequency in the first set of windings 240. In addition to that operation, a current is applied to the second set of windings 250. In this mode, the phase angle and the magnitude of the current in the second set of windings 250 are controlled to transmit torque to the internal rotor 230 via the $9^{th}$ harmonic only. As the skilled person would understand, the phase angle and the magnitude of the current are controlled to vary the amount of torque transferred to the internal rotor 230 via the 9$^{th}$ harmonic. Consequently, the torque transferred to the internal rotor 230 via the interaction between the 6$^{th}$ and 9$^{th}$ harmonics is supplemented by the torque transferred to the internal rotor 230 via the 9$^{th}$ harmonic to provide a power boost mode.

In a third mode of operation, according to another embodiment, the electrical machine 200 operates in a "power generation" mode. This is the opposite of the power boost mode. In this embodiment, the torque ratio is varied to decrease the torque on the internal rotor 230 so as to increase the amount of electrical power removed from, or reduce the net amount of electrical power supplied to, the machine 200 via the windings on the stator 210.

In operation in this mode, torque is transferred between the components of the machine 200 via the interaction between the 6$^{th}$ and 9$^{th}$ harmonics as it was in the first mode. A current is supplied to the second set of windings 250, and this current is controlled to decrease the overall torque ratio between the components in the electrical machine. The 'missing' torque is transferred out of the machine 200 as electrical energy via the second set of windings 250. As in the second mode of operation, the power contribution from the first set of windings 240 is dependent upon the speed ratio of the machine 200. If the speed ratio is such that the internal rotor 230 is rotating faster than would be observed at the intrinsic ratio then positive electrical power is naturally supplied to the first set of windings 240. In this mode, the current in the second set of windings 250 is arranged to reduce the torque on the internal rotor 230 so that electrical power is returned via the second set of windings 250. When the power returned via the second set of windings 250 is greater than the power supplied to the first set of windings 240, the net electrical power in the machine 200 is negative giving electrical power generation. For speed ratios where the internal rotor 230 speed is lower than that which would be observed at the intrinsic ratio, the first set of windings 240 also return electrical power. Because the current in the second set of windings 250 is arranged to reduce the torque on the internal rotor 230, electrical power is also returned via the second set of windings 250. Consequently, the machine 200 will generate electrical power from both sets of windings 240 and 250.

It is noted that the above description is given for an ideal, lossless system. As the skilled person would understand, in practice, there are always power losses. In particular, for low power conditions in the power generation mode, the power losses may be greater than the electrical power returned to the drivers and, as a result, the system may not be able to return electrical power.

In one manner of operation in the third mode, the mechanical power input at the pole piece rotor 220 is held constant, while the mechanical power output at the internal rotor 230 is reduced by reducing the torque ratio.

In another manner of operation in the third mode, all of the mechanical power input to the machine 200 at the pole piece rotor 220 is converted into electrical energy. In that case, the net torque transferred to the internal rotor 230 is 0.

In summary, the key advantage of the electrical machine 200 is that both the torque and the speed ratios between the components in the machine 200 may be varied and they may be varied independently of one and other. This is because torque may be transferred to the internal rotor 230 via two independently controllable harmonics (the 6$^{th}$ and the 9$^{th}$). Consequently, when the electrical machine forms part of a drivetrain, the need for a second electrical machine 200 is mitigated because the electrical machine 200 can meet both the wheels' torque requirements and speed requirements.

Figure 10:
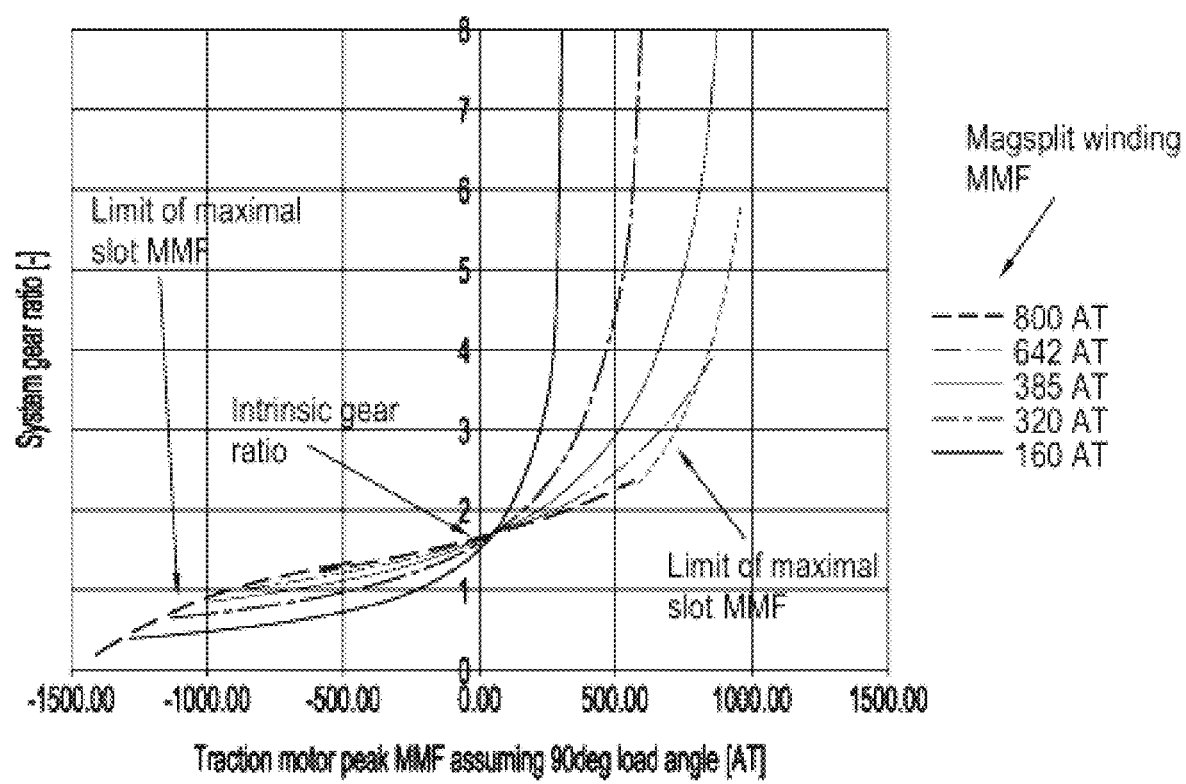
FIG. 10 is a graph which shows the relationship between the magneto motive force of the first and second sets of windings and the system torque for the electrical machine of FIG. 2.

FIG. 10 shows a graph illustrating the relationship between the magneto motive force of the second set of windings 250 and the system gear ratio for varying values of magneto motive force of the first set of windings 240. The magneto motive force is the property of the windings which gives rise to their magnetic fields. The magneto motive force in a magnetic circuit can be considered as equivalent to the voltage in an electrical circuit. It is a function of the number of winding turns and the current in the winding. The graph shows that the current in the second set of windings 250 can be used to control the system gear ratio because for a given magneto motive force of the first set of windings 240, varying the magneto motive force in the second set of windings 250 varies the system gear ratio in a controlled way.

In alternative embodiments, the phase angle between the magnetic field set up by the first set of windings 240 and the magnetic field set up by the permanent magnets 233 is varied to vary the direction of the torque applied in the machine.

In alternative embodiments, the current in the first set of windings 240 is used to control the system gear (speed) ratio. This is also illustrated in FIG. 10 which shows that for a given magneto motive force of the second set of windings 250, varying the magneto motive force in the first set of windings 240 also varies the system gear (speed) ratio. In short, for a fixed magneto motive force of either of the first 240 or second 250 sets of windings, the magneto motive force of the other can be used to vary the system gear (speed) ratio. This is because, whereas the set of windings with the fixed magneto motive force will provide a fixed torque contribution, the set of windings with the varying magneto motive force will provide a variable torque contribution; thus enabling the system gear (speed) ratio to be varied. The magnitude of the magneto motive force in either set of windings is controlled by controlling the amplitude of the current in the respective set of the windings.

In another mode of operation which is an embodiment of this disclosure, and which may be used in accordance with any other of the modes, the current in one of the first or second set of windings 240, 250 can be controlled to boost and/or supress the magnetic coupling of the other of the first or second set of windings 240,250 with the permanent magnets 233. Specifically, this effect is achieved by controlling the phase angle and amplitude of the current of one of the first or second sets of windings, as will be explained below. By controlling the current as outlined below, the permanent magnet 233 magnetic field with which the other of the first or second windings 240, 250 interact may be boosted or supressed. The current can also be controlled to increase or reduce flux density in certain parts of the machine 200 and/or to reduce or increase the reluctance of the circuit by reducing or increasing magnetic saturation in the machine.

For example, the current in the second set of windings 250 can be controlled to boost and/or suppress the magnetic field generated by the permanent magnets 233 in order to affect the torque transmitted between the magnetic field generated by the first set of windings 240 and the internal rotor 230. In one mode of operation, the current in the second set of windings 250 is controlled so that the phase angle between its magnetic field and the magnetic field generated by the permanent magnets 233 is 0 degrees or 180 degrees. In both cases, zero torque is transmitted between the magnetic field generated by the second set of windings 250 and the magnetic field generated by the permanent magnets 233. This is because torque is proportional to the sine of the phase angle. However the magnetic field generated by the second set of windings 250 still exists in the air gap between the internal rotor 230 and the pole piece rotor 220. The resultant magnetic field in the air gap is therefore the sum of the magnetic field generated by the second set of windings 250 and the magnetic field generated by the permanent magnets 233. Therefore, as the peak torque transmitted between the magnetic field generated by the first set of windings 240 and the magnetic field generated by the permanent magnets 233 is dependent upon the amplitude of the magnetic field in the air gap, the peak torque transmitted between those two fields is increased and/or reduced by boosting and/or suppressing the magnetic field in the air gap. In other words, by boosting and/or suppressing the magnetic field generated by the permanent magnets 233. The magnetic field generated by the permanent magnets 233 is boosted when the phase angle between the magnetic field generated by the second set of windings 250 and the magnetic field generated by the permanent magnets 233 is 0 degrees. The magnetic field generated by the permanent magnets 233 is suppressed when the phase angle between the magnetic field generated by the second set of windings 250 and the magnetic field generated by the permanent magnets 233 is 180 degrees.

As noted above, conversely, the current in the first set of windings 240 can be controlled to boost and/or suppress the magnetic field generated by the permanent magnets 233 in order to affect the torque transmitted between the magnetic field generated by the second set of windings 250 and the internal rotor 230. This is because, as has previously been described, the magnetic field generated by the first set of windings 240—which has 6 pole pairs—is modulated by the pole piece rotor 220 to result in a magnetic field which has 9 pole pairs in the air gap between the pole piece rotor 220 and the internal rotor 230. In one mode of operation, the current in the first set of windings 240 is controlled so that the phase angle between this magnetic field and the magnetic field generated by the permanent magnets 233 is 0 degrees or 180 degrees. In both of these cases, zero torque is transmitted between the magnetic field generated by the first set of windings 240 and the magnetic field generated by the permanent magnets 233. This is because torque is proportional to the sine of the phase angle. However the magnetic field generated by the first set of windings 240 still exists in the air gap between the internal rotor 230 and the pole piece rotor 220. The resultant magnetic field in the air gap is therefore the sum of the magnetic field generated by the first set of windings 240 and the magnetic field generated by the permanent magnets 233. Therefore, as the peak torque transmitted between the magnetic field generated by the second set of windings 250 and the magnetic field generated by the permanent magnets 233 is dependent upon the amplitude of the magnetic field in the air gap, the peak torque transmitted between those two fields is increased and/or reduced by boosting and/or suppressing the magnetic field in the air gap. In other words, by boosting and/or suppressing the magnetic field generated by the permanent magnets 233. The magnetic field generated by the permanent magnets 233 is boosted when the phase angle between the magnetic field generated by the first set of windings 240 and the magnetic field generated by the permanent magnets 233 is 0 degrees. The magnetic field generated by the permanent magnets 233 is suppressed when the phase angle between the magnetic field generated by the first set of windings 240 and the magnetic field generated by the permanent magnets 233 is 180 degrees.

Alternative Stator Arrangements

Stator 210 is one example of dual harmonic stator. A dual harmonic stator is one which is suitably wound to set up a magnetic field which has two different pole pair components, or harmonics. A dual wound stator has two windings. In this disclosure, a winding is an arrangement of coils around the stator of an electrical machine for producing a spatially and temporally varying magnetic field. A spatially and temporally varying magnetic field is produced by use of time varying, controlled currents. The currents need not be equal in each individual section of the winding. The currents need not be equal in each individual coil of the winding.

In an embodiment, the stator 210 in electrical machine 200 is replaced with a stator having a structurally similar stator body to that of stator 210, however only one winding is arranged around the stator body. Each tooth of the teeth 214 carries a single coil of the winding. In operation, each coil is provided with its own power electronics. Each coil has its own individually controllable current applied. The desired field pattern in the air gap between the stator and the pole piece rotor 220 is synthesised. Specifically, the current applied to each coil is individually controlled by its power electronics to create a magnetic field in the air gap which has both a 6 and a 9 pole pair component. The current applied to each coil is further individually controlled to vary the torque and the speed ratio in the manner previously described.

A method of synthesising the desired magnetic field pattern in the air gap between the stator 210 and the pole piece rotor 220 will be now be described.

Control means, optionally taking the form of a microprocessor, may be arranged to carry out the method of synthesising the desired magnetic field pattern in the air gap between the stator 210 and the pole piece rotor 220.

First, the MMF pattern giving rise to the desired magnetic field in the air gap between the stator 210 and the pole piece rotor 220 is calculated. As previously described, magneto motive force (MMF) is the property of certain substances which give rise to their magnetic fields. In this disclosure, the winding or windings on the stator 210 produce MMF. The units of MMF are ampere-turn (AT).

In this embodiment, the desired magnetic field pattern in the air gap between the stator and the pole piece rotor 220 is that set up by the first 240 and second 250 sets of windings of the previously described embodiment shown in FIG. 2. Thus it is appropriate to calculate the MMF pattern of each of the first 240 and second 250 sets of windings in order to determine the overall MMF pattern giving rise to the desired magnetic field in the air gap between the stator 210 and the pole piece rotor 220.

MMF may be calculated according to the following equation:

$$MMF = NI \qquad \text{Equation 6}$$

where N is number of turns and I is the electric current in the circuit.

Each coil of the first and second sets of windings 240, 250 has a known number of turns on its respective tooth of the teeth 214. Accordingly, using Equation 6, the MMF pattern in the air gap between the stator 210 and the pole piece rotor 220 associated with each of the windings patterns for the first and second sets of windings 240, 250 may be calculated.

The current in each of the three phases of the first and second sets of windings 240, 250 must be considered. As the skilled person would understand, at any instance of time, the value of the current in each phase is known and can be applied to the winding patterns shown in FIGS. 3 and 4 respectively to calculate the MMF pattern for the first 240 and second 250 sets of windings respectively.

Figure 11:
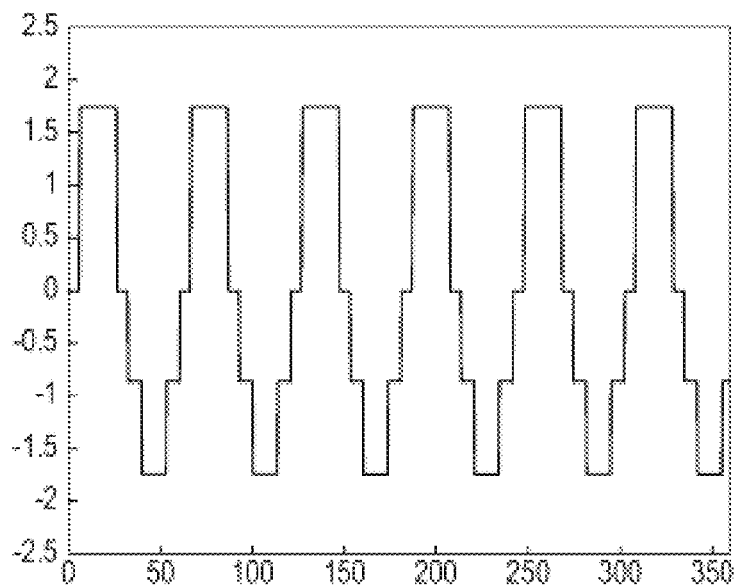
FIG. 11 is a graph which shows the magneto motive force pattern for the first set of windings, when the magnetic field set up by the first set of windings is at 0 degrees in the electrical machine.

The resultant MMF pattern for the first set of windings 240, when the magnetic field set up by the first set of windings 240 is at 0 degrees in the electrical machine 200, is shown in FIG. 11. The x-axis of FIG. 11 is position in degrees around the axis of the electrical machine 200. The y-axis of FIG. 11 is indicative of magnitude of the MMF. FIG. 11 shows a rough sine wave, which repeats 6 times over 360 degrees. FIG. 11 therefore evidences the 6 pole pair nature of the MMF pattern for the first set of windings 240. As the magnetic field set up by the first set of windings 240 rotates to other angles in the electrical machine 200, the pattern will change, however its 6 pole pair nature remains.

Figure 12:
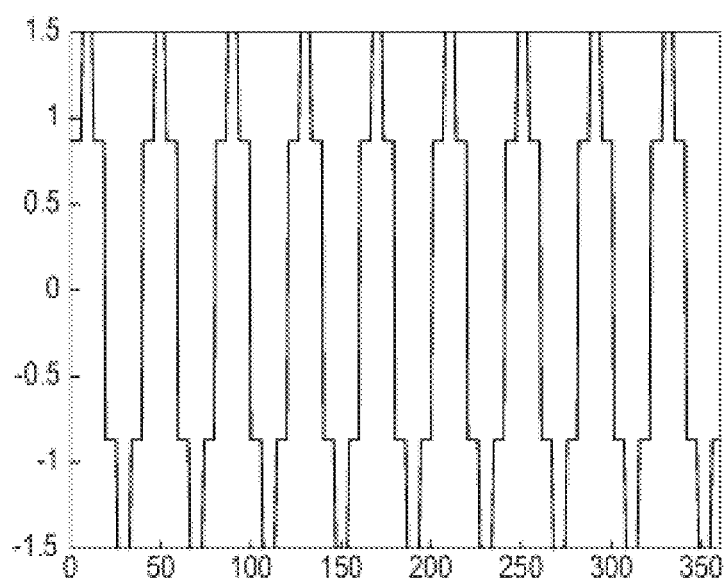
FIG. 12 is a graph which shows the magneto motive force pattern for the second set of windings, when the magnetic field set up by the first set of windings is at 0 degrees in the electrical machine.

The resultant MMF pattern for the second set of windings 250, when the magnetic field set up by the second set of windings 250 is at 0 degrees in the electrical machine 200, is shown in FIG. 12. The x-axis of FIG. 12 is position in degrees around the electrical machine 200. The y-axis of FIG. 12 is indicative of magnitude of the MMF. FIG. 12 shows a rough sine wave which repeats 9 times over 360 degrees. FIG. 12 therefore evidences the 9 pole pair nature of the MMF pattern for the second set of windings 250. As the magnetic field set up by the second set of windings 250 rotates to other angles in the electrical machine 200, the pattern will change, however the 9 pole pair nature remains.

The net MMF pattern for the first 240 and second 250 sets of windings is the sum of their respective MMF patterns. Once summed, the summed MMF pattern can be decomposed into its $6^{th}$ and $9^{th}$ pole pair components and each component respectively and independently interacted with.

Figure 13:
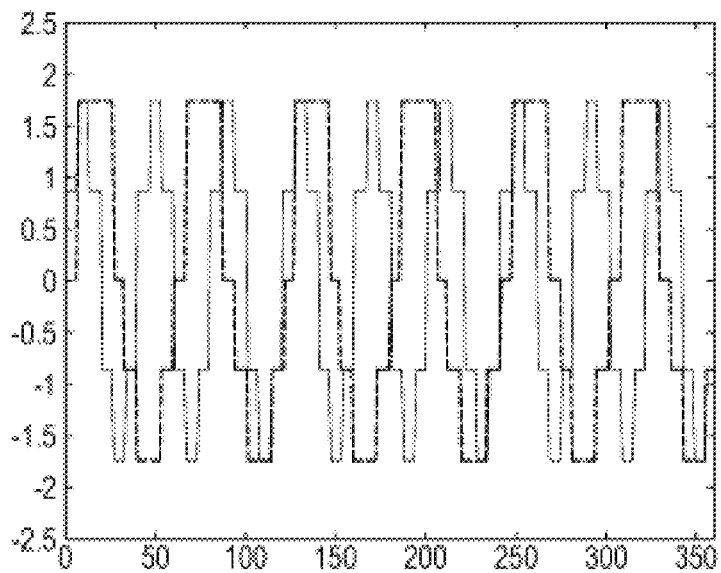
FIG. 13 is a graph which shows the superposition of the magneto motive force patterns of the first and second sets of windings.

FIG. 13 shows the MMF patterns for the first 240 and second 250 sets of windings previously described in respect of FIGS. 11 and 12, superimposed on the same axes. The x-axis and the y-axis are the same as those in FIGS. 11 and 12.

Figure 14:
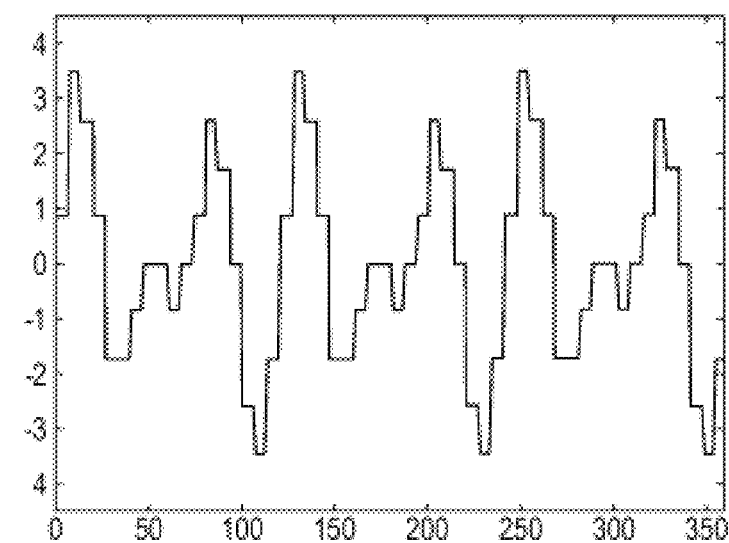
FIG. 14 is a graph which shows the sum of the MMF patterns for the first and second sets of windings.

FIG. 14 shows the sum of the MMF patterns for the first 240 and second 250 sets of windings previously described in respect of FIGS. 11 and 12. The x-axis and the y-axis are the same as those in FIGS. 11 and 12. FIG. 14 illustrates the net MMF pattern which gives rise to the desired magnetic field in the air gap between the stator 210 and the pole piece rotor 220 at a given instance in time. The pattern shown in FIG. 14 will vary as the component of the magnetic field set up by each of the first 240 and second 250 sets of windings rotates to other angles in the electrical machine 200. The component of the magnetic field set up by each of the first 240 and second 250 sets of windings may rotate in a same or a different direction to the other. The relative magnitudes of the components of the magnetic field set up by the first 240 and second 250 sets of windings may vary to suit the operational needs of the electrical machine 200.

Figure 15:
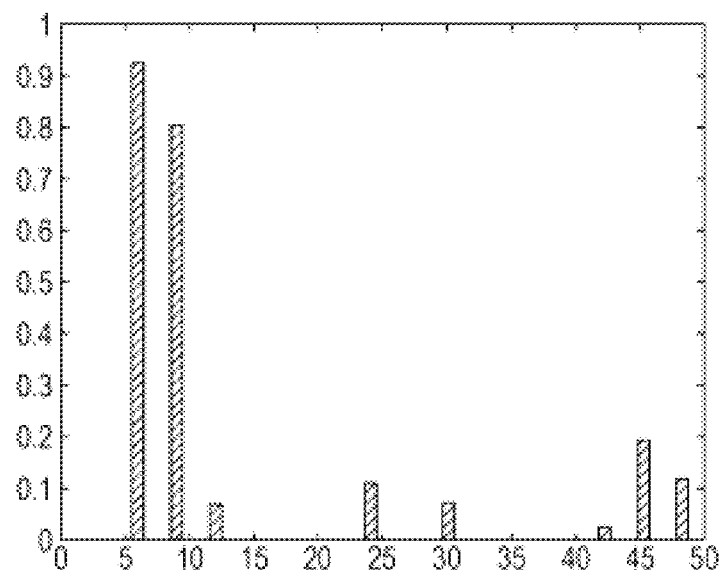
FIG. 15 is a graph which shows the harmonic content of the sum of the MMF patterns for the first and second sets of windings of FIG. 14.

Once the MMF pattern giving rise to the desired magnetic field in the air gap between the stator 210 and the pole piece rotor 220 has been calculated in the way described, the harmonic content of the pattern may be calculated using a fast Fourier transform (FFT) algorithm in a way which would be known to the skilled person. The harmonic content of the MMF pattern shown in FIG. 14 is shown in FIG. 15. As expected, FIG. 15 shows peaks at the $6^{th}$ and $9^{th}$ harmonics; these peaks correspond to 6 and 9 pole pairs, respectively.

Having determined the MMF pattern giving rise to the desired magnetic field in the air gap between the stator 210 and the pole piece rotor 220, alternative winding approaches may be adopted provided that they are capable of producing the same or a substantially similar MMF pattern.

One such alternative winding approach is the winding approach of the present embodiment in which the stator 210 in electrical machine 200 is replaced with a stator having a structurally similar stator body to that of stator 210, however only one winding is arranged around the stator body. Each tooth of the teeth 214 carries a single coil of the winding. In operation, each coil is provided with its own power electronics, including a controller. Each controller determines the MMF contribution its coil must make to result in the MMF pattern giving rise to the desired magnetic field in the air gap between the stator 210 and the pole piece rotor 220. To do this, each controller determines the MMF contribution required from the 6th and 9th harmonics; sums them; and controls the corresponding level of current to its respective coil.

The calculations required for this are apparent from the winding patterns shown in FIGS. 3 and 4. For example, the slot in the 6 pole pair winding shown in FIG. 3 contains "U+U+". Accordingly, the controller calculates the phase current required for U+U+ from rotor position. In this embodiment, the coil in the first slot additionally contains "U+" from the first slot in the 9 pole pair winding shown in FIG. 4. Note that U+ of the 6 pole pair component is unrelated to U+ of the 9 pole pair component. Accordingly, the controller additionally calculates the phase current required for U+ of the 9 pole pair component. Accordingly, the total current required to be supplied to the coil in the first slot is calculated by summing the current required for U+U+ of the 6 pole pair component and the current required for U+ of the 9 pole pair component. In this way, each controller determines the MMF contribution required from the 6th and 9th harmonics; sums them; and controls the corresponding level of current to its respective coil.

In another embodiment, the stator 210 in electrical machine 200 is replaced with a stator having a structurally similar stator body to that of stator 210, however only one winding is arranged around the stator body. In operation, a current is applied to the winding. In the way described above, the current is synthesised by a controller to result in the creation of the desired field pattern in the air gap between the stator and the pole piece rotor 220. Specifically, the current applied is synthesised to set up a magnetic field in the air gap which has both a 6 pole pair and a 9 pole component.

In one example of this embodiment, the coils of the one winding are grouped into 'phases' to exploit symmetry in the MMF pattern required for the desired field pattern in the air gap between the stator 210 and the pole piece rotor 220. The coils of the one winding are grouped with those with identical required MMF for all positions of the magnetic field set up by the one winding in the electrical machine 200. In this case, the winding is formed from 18 phases, each with 3 coils displaced equally in space in the electrical machine 200. This is because 3 is the lowest common divisor of 6 and 9. The three-way symmetry in the MMF pattern required for the desired field pattern in the air gap between the stator and the pole piece rotor 220 is illustrated in FIG. 14, which shows that the MMF pattern repeats three times around the axis of the electrical machine 200.

In an alternative embodiment, any number of windings may be arranged around the stator and a poly phase current applied. The current applied to the winding or windings can be non-sinusoidal or it can comprise a number of overlapping sinusoids.

Alternative Methods of Operation

In an embodiment, the two harmonics of the magnetic flux in the electrical machine 200 used to transfer torque may be different to the harmonics used in the electrical machine 200 of the first embodiment, provided the appropriate modification(s) are made to the electrical machine, such modifications as would occur to the skilled reader. For example, the $2^{nd}$ and $5^{th}$ harmonics could be used. As would occur to the skilled reader, the two harmonics should be chosen so that they do not couple with each other in the machine.

In an embodiment, the permanent magnets 233 on the internal rotor 230 are replaced with windings arranged to produce a magnetic field with substantially the same properties as the magnetic field provided by the permanent magnets 233, provided the appropriate modification(s) are made to the electrical machine, such modifications as would occur to the skilled reader.

In an embodiment, the harmonics and the relative and absolute magnitudes of the harmonics present in the modulated permanent magnet magnetic field are varied by modifying the design of the pole pieces 222, such modifications as would occur to the skilled reader.

In an embodiment, the magnitude of each harmonic present in the magnetic flux associated with each set of windings is varied by tailoring the amount of area of slot 216 available to the respective windings.

In an embodiment, the electrical machine 200 is a CVT system with capability to add and/or subtract electrical power by controlling the current in the stator windings. Control of the current can be done using a controller.

In an embodiment, two 3 phase inverters are electrically connected to the first and second sets of windings 240, 250. In another embodiment, one inverter is electrically connected to both the first and second sets of windings 240, 250.

Applications

In an embodiment, the electrical machine 200 is used in the power train of a wind turbine.

In an embodiment, the electrical machine 200 is used in the power train of a vehicle to power one or more ancillary components. Advantageously, such components could be powered by the electrical machine 200 in the pure electric mode previously described. Ancillary components may include one or more of a hydraulic compression system, an air compression system, a secondary pumping system and/or an air conditioning compressor.

In an embodiment, the electrical machine 200 is mains connected and is used as a variable speed drive. For example, the electrical machine 200 may be used to power industrial machinery. Industrial machinery may include machinery arranged to carry out at least one of a pumping, crushing and/or milling operation.

In an embodiment, the electrical machine 200 is used in a marine propulsion power train. It is often advantageous, for environmental reasons, for marine vehicles to be powered in the pure electric mode when near to shore. As discussed above, the electrical machine 200 can be used to power a marine vehicle propulsion device in a pure electric mode. Advantageously, the electrical machine 200 is also robust to the sudden introduction of torque on the propeller when the propeller is dropped in to water with the engine running. This is at least because the electrical machine 200 can be managed to avoid the torque on the propeller shaft being transferred to the engine shaft using the modes previously described.

Power Conversion

As discussed above, a known blended electric hybrid power train system (not shown) comprises two electrical machines (also not shown). In that case, each electrical machine 200 is provided with its own inverter. Each inverter inverts DC to AC. The DC is supplied to the vehicle's DC link. The DC link is connected to both inverters and is employed to allow power to flow between the two inverters and therefore the two electrical machines. The DC link voltage is typically allowed to vary in magnitude. Though potentially beneficial for the efficiency of the two electrical machines, the variation in voltage on the DC link necessitates a DC/DC converter to be employed between the DC link and the energy storage system of the vehicle. Such a DC/DC converter is needed so that power can flow into and out of the energy storage system at the desired voltage. The prior art system described can be called a 'two inverter system'.

In an embodiment of this disclosure, the electrical machine 200 is part of a blended electric hybrid power train system. As previously discussed, advantageously, when the electrical machine 200 is employed in a blended electric hybrid power train system, the second electrical machine 200 can be removed from the system.

Figure 16:
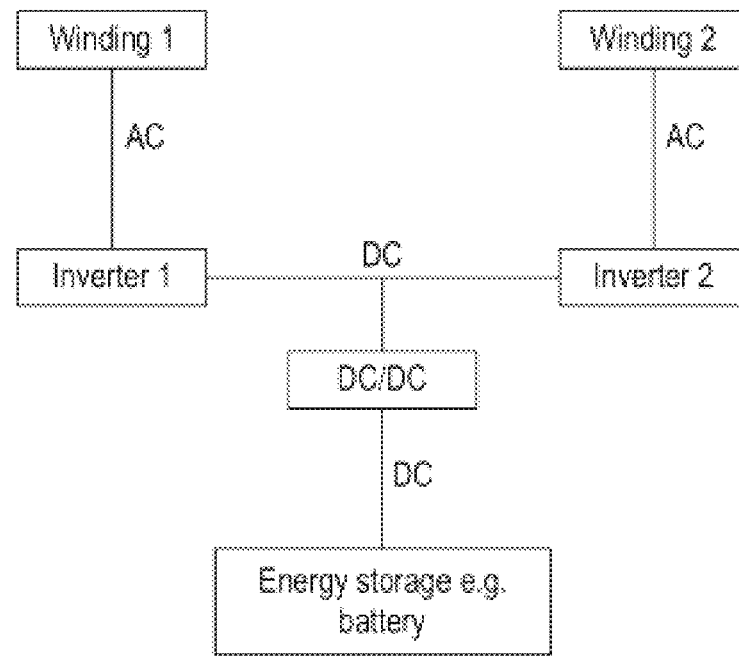
FIG. 16 is a schematic diagram which shows an electrical architecture to which the electrical machine of FIG. 2 may be connected according to another embodiment.

In an embodiment of this disclosure, two AC/DC converters are employed with the electrical machine: one inverter to supply current to the first set of windings 240; and the other inverter to supply current to the second set of windings 250. Such an embodiment is illustrated in FIG. 16. FIG. 16 illustrates that the energy storage system, e.g. the battery, is electrically connected to a DC/DC converter. The DC/DC converter is electrically connected to the DC link. The DC link is electrically connected to two inverters. One of the inverters is electrically connected to the first winding, such as the first set of windings 240; the other of the inverters is electrically connected to the second winding, such as the second set of windings 250.

Figure 17:
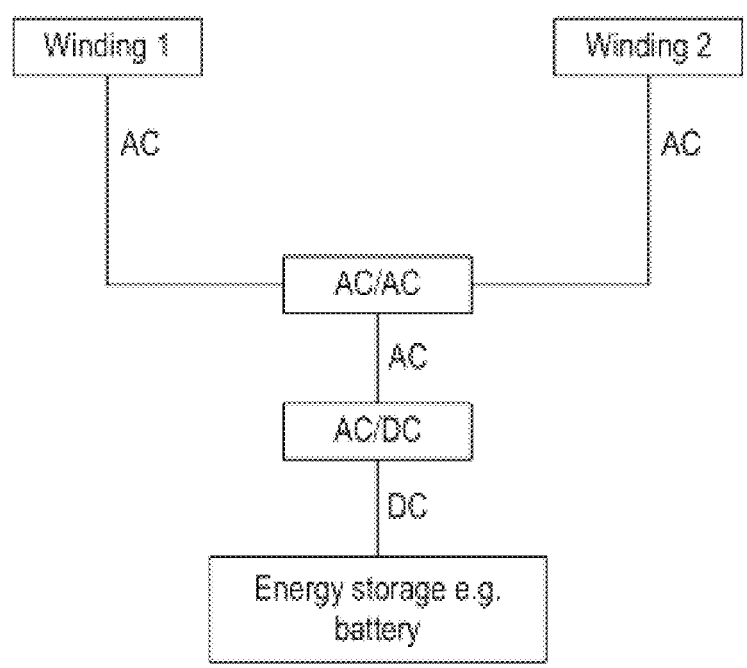
FIG. 17 is a schematic diagram which shows an electrical architecture to which the electrical machine of FIG. 2 may be connected according to another embodiment.

In another embodiment, the two inverters are removed and the first and second sets of windings 240, 250 are electrically linked via an AC/AC converter. Accordingly, there is no requirement for the DC link between the machines and the DC/DC link is removed. The AC/AC converter can be a matrix converter. Such an embodiment is shown in FIG. 17. This figure illustrates that the energy storage system, e.g. the battery, is electrically connected to an AC/DC converter. The DC/AC converter converts the DC current from the battery to AC current. The AC current is fed to the AC/AC converter. The AC/AC converter is electrically connected to both the first and second sets of windings 240, 250. Advantageously, such an arrangement avoids the need to smooth the capacitance on the DC link, because there is no DC link. Further advantageously, as noted above, two inverters have been removed. Such an arrangement therefore leads to lower cost converter designs with reduced volumetric footprints. Consequently, weight, size, cost and other associated factors of the vehicle drivetrain are reduced.

In alternative embodiments, the words 'produced' and 'produces' could be replaced with the words 'set up' and 'sets up'.

In alternative embodiments, embodiments described in this disclosure may be used in at least one of a linear field machine and/or an axial field machine with appropriate modification(s) as would occur to the skilled reader.

Where it is possible without apparent technical incompatibility, features of different embodiments disclosed herein may be combined in further embodiments, with some features optionally being omitted.

The invention claimed is:

1. An electrical machine comprising:
   a first rotor, the first rotor producing a first magnetic field having a first number of pole pairs;
   a second rotor comprising a plurality of pole pieces, the plurality of pole pieces being arranged to modulate the first magnetic field to produce a second magnetic field having a second number of pole pairs;

wherein the number of pole pieces is the sum of the first and second numbers of pole pairs, and wherein the first number of pole pairs is not equal to the second number of pole pairs;

a stator comprising one or more windings arranged to produce a third magnetic field arranged to interact with the first number of pole pairs and the second number of pole pairs, the third magnetic field also having the first number of pole pairs and the second number of pole pairs;

wherein varying the current in the one or more windings changes a ratio between torque applied to the first rotor and torque applied to the second rotor.

2. The electrical machine of claim 1, wherein the one or more windings comprises a first set of windings and a second set of windings, wherein the first set of windings is arranged to interact with the second number of pole pairs, and the second set of windings is arranged to interact with the first number of pole pairs.

3. The electrical machine of claim 2, further comprising a driver configured to vary the frequency of a current in the first set of windings to vary the speed ratio of the electrical machine.

4. The electrical machine of claim 2, further comprising a driver configured to vary an amplitude and/or a phase angle of a current in the second set of windings to vary the torque ratio of the electrical machine.

5. The electrical machine of claim 2, wherein each of the first set of windings and the second set of windings is arranged to receive a separate current input.

6. The electrical machine of claim 5, wherein the separate current input to each of the first set of windings and the second set of windings is supplied by a separate driver.

7. The electrical machine of claim 1, wherein the first rotor is connected to an output shaft.

8. The electrical machine of claim 1, wherein the second rotor is connected to an input shaft.

9. The electrical machine of claim 1, wherein at least one of the pole pieces is formed of ferromagnetic material.

10. The electrical machine of claim 1, wherein the first number of pole pairs is not equal to the second number of pole pairs.

11. The electrical machine of claim 1, wherein either:
the first rotor is arranged to transmit mechanical power in to the electrical machine, and the second rotor is arranged to transmit mechanical power out of the electrical machine; or
the first rotor is arranged to transmit mechanical power out of the electrical machine, and the second rotor is arranged to transmit mechanical power in to the electrical machine.

12. The electrical machine of claim 1, further comprising a controller and one or more drivers configured to vary the speed ratio and/or the torque ratio of the machine.

13. A vehicle power train comprising the electrical machine of claim 1.

14. A method of operating an electrical machine, the electrical machine comprising:
a first rotor, the first rotor producing a first magnetic field having a first number of pole pairs;

a second rotor comprising a plurality of pole pieces, the plurality of pole pieces being arranged to modulate the first magnetic field to produce a second magnetic field having a second number of pole pairs;

wherein the number of pole pieces is the sum of the first and second numbers of pole pairs, and wherein the first number of pole pairs is not equal to the second number of pole pairs;

a stator comprising one or more windings arranged to produce a third magnetic field arranged to interact with the first number of pole pairs and the second number of pole pairs, the third magnetic field also having the first number of pole pairs and the second number of pole pairs;

wherein varying the current in the one or more windings changes a ratio between torque applied to the first rotor and torque applied to the second rotor;

wherein the method comprises transmitting mechanical power in to and/or out of the electrical machine.

15. The method of claim 14, wherein the one or more windings comprises a single winding and the single winding is arranged to produce the third magnetic field, the third magnetic field having the first and the second numbers of pole pairs.

16. The method of claim 15, the electrical machine comprising a controller, the method further comprising:
the controller receiving an instruction indicative of required properties of the third magnetic field.

17. The method of claim 16, wherein the required properties comprise the required properties of the component of the third magnetic field having the first number of pole pairs and the required properties of the component of the third magnetic field having the second number of pole pairs.

18. The method of claim 17, further comprising:
calculating a magneto motive force of the single winding for producing the required properties of the third magnetic field.

19. The method of claim 18, further comprising:
calculating the required current of the single winding from the calculated magneto motive force of the single winding for producing the required properties of the third magnetic field.

20. The method of claim 19, wherein the single winding is arranged to receive a current input from a driver, and the method further comprises:
the controller sending an instruction to the driver to supply the required current to the single winding.

21. The method of claim 18, wherein the single winding comprises a plurality of spatially distributed coils and the method further comprises:
calculating the required current of each coil from the calculated magneto motive force of the single winding for producing the required properties of the third magnetic field.

22. The method of claim 21, wherein each coil is arranged to receive a current input from a respective driver, and the method further comprises:
the controller sending an instruction to each driver to supply the required current to its respective coil.

* * * * *